(12) United States Patent
Motta

(10) Patent No.: US 10,296,992 B2
(45) Date of Patent: May 21, 2019

(54) SYSTEM AND METHOD THAT FACILITATES PROVIDING A VIRTUAL AGENT

(71) Applicant: Erick Motta, Fresno, CA (US)

(72) Inventor: Erick Motta, Fresno, CA (US)

( * ) Notice: Subject to any disclaimer, the term of this patent is extended or adjusted under 35 U.S.C. 154(b) by 427 days.

(21) Appl. No.: 15/040,749

(22) Filed: Feb. 10, 2016

(65) Prior Publication Data

US 2017/0228838 A1  Aug. 10, 2017

(51) Int. Cl.
| | |
|---|---|
| *G06Q 30/00* | (2012.01) |
| *G06Q 50/16* | (2012.01) |
| *G07C 9/00* | (2006.01) |
| *G06Q 30/06* | (2012.01) |
| *G06F 16/22* | (2019.01) |
| *G03H 1/00* | (2006.01) |
| *G02B 5/32* | (2006.01) |
| *G06T 19/00* | (2011.01) |
| *H04N 7/14* | (2006.01) |

(52) U.S. Cl.
CPC .............. *G06Q 50/16* (2013.01); *G02B 5/32* (2013.01); *G03H 1/0005* (2013.01); *G06F 16/2228* (2019.01); *G06Q 30/0617* (2013.01); *G06T 19/006* (2013.01); *G07C 9/00079* (2013.01); *G07C 9/00126* (2013.01); *G07C 9/00134* (2013.01); *H04N 7/142* (2013.01)

(58) Field of Classification Search
CPC ..... G06Q 30/06; G06Q 30/0601–0643; G06Q 30/08; G06Q 50/10; G06Q 50/16–167
See application file for complete search history.

(56) References Cited

U.S. PATENT DOCUMENTS

| | | | | |
|---|---|---|---|---|
| 9,852,487 | B1 * | 12/2017 | Farnsworth | G06Q 50/16 |
| 2006/0236407 | A1 * | 10/2006 | Mergenthaler | G06F 21/32 |
| | | | | 726/28 |
| 2010/0010673 | A1 * | 1/2010 | Wang | B25J 9/1689 |
| | | | | 700/264 |
| 2014/0277847 | A1 * | 9/2014 | Cann | B25J 5/007 |
| | | | | 701/2 |
| 2016/0180621 | A1 * | 6/2016 | Desinor, Jr. | G07C 9/00896 |
| | | | | 340/5.61 |
| 2017/0344923 | A1 * | 11/2017 | Pike | G06Q 10/06312 |

OTHER PUBLICATIONS

Five ways robots will change real estate. Mar. 1, 2013. https://www.inman.com/next/five-ways-robots-will-change-real-estate/ (Year: 2013).*

* cited by examiner

*Primary Examiner* — William J Allen
(74) *Attorney, Agent, or Firm* — Loza & Loza, LLP; Daniel S. Castro

(57) ABSTRACT

Aspects are disclosed for providing users with a virtual agent at a property. A user is authenticated based on user information included in a request to enter a property secured by a locking mechanism. The user is then provided with physical access to the property remotely in response to an authentication of the user. The user is also provided with a virtual tour of the property, which comprises a remote real time interaction with the user during the physical access of the property.

12 Claims, 21 Drawing Sheets

SYSTEM AND METHOD THAT FACILITATES PROVIDING A VIRTUAL AGENT

TECHNICAL FIELD

The subject disclosure generally relates to virtual tours of properties, and more specifically to interactive virtual tours of properties in which physical access is remotely provided.

BACKGROUND

By way of background concerning conventional property tours, it is noted that scheduling such tours is often undesirably cumbersome and inefficient. For instance, when a prospective buyer sees a real estate sign on a house they wish to purchase, they generally call their agent or the agent on the sign. The actual showing of the property, however, depends on the agents' availability to meet with the prospective buyer at the property, which may not occur until several days later. To overcome this delay, many agents provide virtual tours of the property, which prospective buyers may instantly access online. Such tours, however, do not provide prospective buyers with physical access to the property, nor do they provide prospective buyers with a mechanism to interact with an agent during the tour.

Accordingly, it would be desirable to provide a system and method which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with providing users with a virtual agent at a property. In one such aspect, a method is provided which includes authenticating a user based on user information included in a request to enter a property secured by a locking mechanism. The method further includes providing the user with physical access to the property in response to an authentication of the user, and providing the user with a virtual tour of the property. For this embodiment, the physical access is remotely provided, and the virtual tour comprises a remote real time interaction with the user during the physical access of the property.

In another aspect, a system is provided. Within such embodiment, the system includes an authentication component, an access component, and an interaction component. The authentication component is configured to authenticate a user based on user information included in a request to enter a property secured by a locking mechanism, whereas the access component is configured to provide the user with physical access to the property in response to an authentication of the user, and the interaction component is configured to provide the user with a virtual tour of the property. For this embodiment, the access unit is further configured to provide the physical access via remote control, and the virtual tour comprises a remote real time interaction with the user during the physical access of the property.

In a further aspect, a computer-readable storage medium is provided. The computer-readable storage medium comprises a memory component configured to store computer-readable instructions that include instructions for performing various acts. For this particular embodiment, the acts include authenticating a user based on user information included in a request to enter a property secured by a locking mechanism. The acts further includes providing the user with physical access to the property in response to an authentication of the user, and providing the user with a virtual tour of the property. For this embodiment, the physical access is remotely provided, and the virtual tour comprises a remote real time interaction with the user during the physical access of the property.

Aspects that facilitate matching a user with a virtual agent are also contemplated. In one such aspect, a method is provided which includes maintaining a database of virtual agents in which each of the virtual agents are remotely located from a property secured by a locking mechanism. The method also includes authenticating a user based on user information included in a request to enter the property, and matching an authenticated user with a host agent of a virtual tour. For this embodiment, the host agent is selected from the database of virtual agents, and the virtual tour comprises a remote real time interaction between the user and the host agent while the user physically accesses the property.

In another aspect, a management system is provided. Within such embodiment, the management system includes an agent component, a user component, and a matching component. The agent component is configured to maintain a database of virtual agents in which each of the virtual agents are remotely located from a property secured by a locking mechanism. The user component is configured to authenticate a user based on user information included in a request to enter the property, whereas the matching component is configured to match an authenticated user with a host agent of a virtual tour. For this embodiment, the host agent is selected from the database of virtual agents, and the virtual tour comprises a remote real time interaction between the user and the host agent while the user physically accesses the property.

In a further aspect, a computer-readable storage medium is provided. The computer-readable storage medium comprises a memory component configured to store computer-readable instructions that include instructions for performing various acts. For this particular embodiment, the acts include maintaining a database of virtual agents in which each of the virtual agents are remotely located from a property secured by a locking mechanism. The acts also include authenticating a user based on user information included in a request to enter the property, and matching an authenticated user with a host agent of a virtual tour. For this embodiment, the host agent is selected from the database of virtual agents, and the virtual tour comprises a remote real time interaction between the user and the host agent while the user physically accesses the property.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Overview

As discussed in the background, it is desirable to provide a system and method which overcomes the various limitations of conventional property tours. The embodiments disclosed herein are directed towards overcoming such limitations by instantly providing physical access to a desired property, and providing virtual tours of the property during such access in which the prospective buyer interacts with a virtual agent in real time. By decreasing the time that a potential buyer has to wait to see a home, aspects disclosed herein desirably increase the chances for a seller to sell their home. Indeed, prospective home buyers often drive around looking for signage indicating that a home is for sale. Upon finding a home that they would like to preview, conventional systems require scheduling an appointment with their real estate agent or the listing agent, wherein the physical availability of an agent may delay the preview by several days. Aspects disclosed herein eliminate this delay by instantly providing authenticated prospective buyers with physical access to a desired property via a virtual/remote agent system. For instance, aspects are contemplated in which a desired property is remotely unlocked by a licensed real estate agent, wherein the prospective buyer is then provided with a virtual tour of the property by a mobile robot. Here, it is further contemplated that such mobile robot is configured to enable a remotely located real estate agent to interact with the prospective buyer in real time, and that an array of cameras/sensors within the property may be included which enable the agent to remotely monitor the property throughout the tour.

Exemplary Virtual Agent Environment

Figure 1:
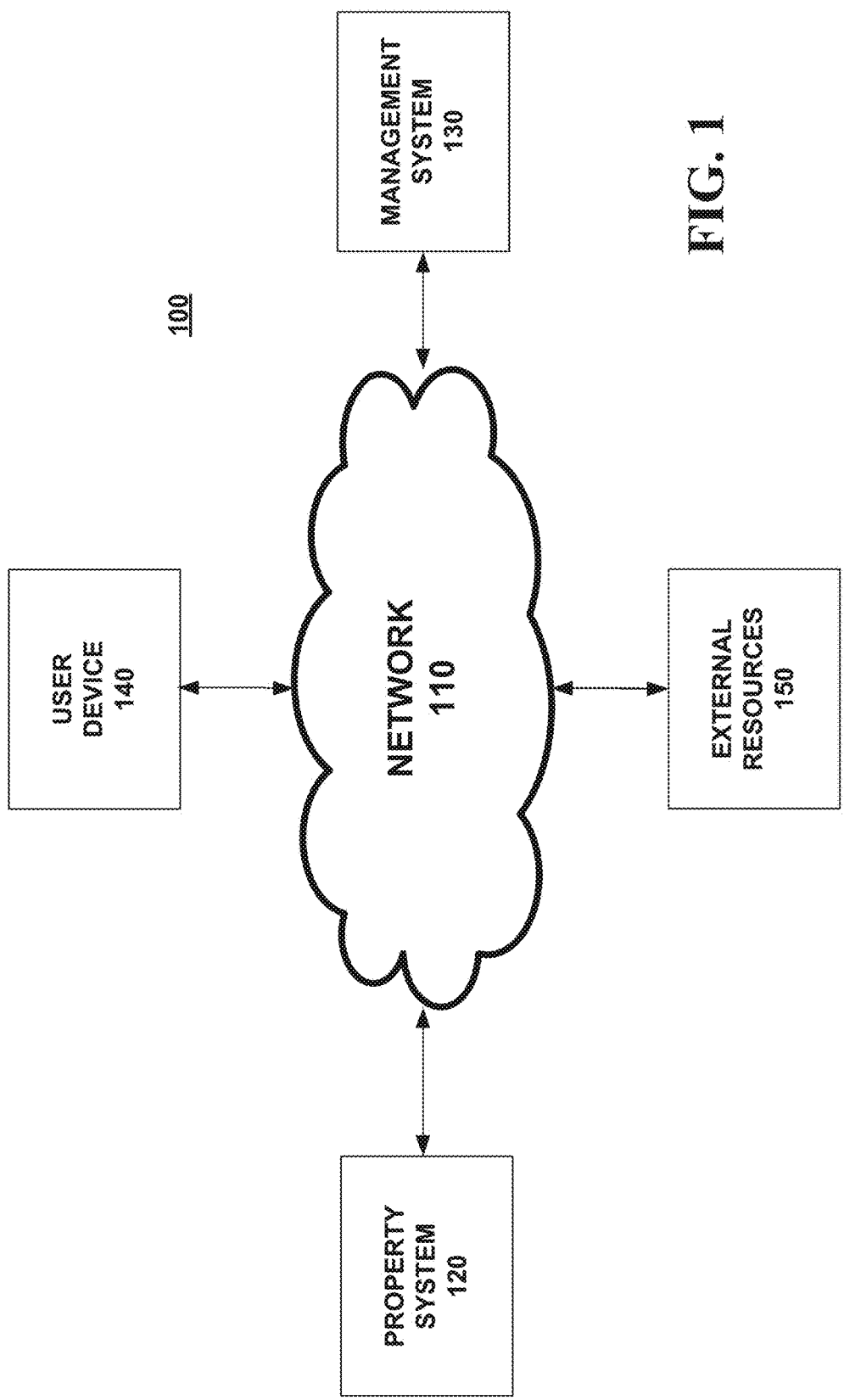
FIG. 1 illustrates an exemplary environment that provides a virtual agent in accordance with an aspect of the subject specification.

Referring first to FIG. 1, an exemplary environment that facilitates a virtual agent system in accordance with an aspect of the subject specification is provided. As illustrated, environment 100 includes a property system 120, which is coupled to a management system 130, a user device 140, and external resources 150 via network 110 (e.g., the Internet). Within such embodiment, it is contemplated that the property system 120 may include any of various components physically located on the property (e.g., digital locking mechanisms, mobile robot, cameras/sensors, etc.), which may be remotely controlled and/or monitored by a management system 130. During operation, it is further contemplated that prospective home buyers will submit a request to view a particular home either via a user device 140 (e.g., smartphone, laptop, etc.) or a user interface included as part of the property system 120 (e.g., a touchscreen on the front porch of the desired home). The management system 130 then authenticates the prospective home buyer based on user information included in the request, wherein such authentication may include retrieving and/or corroborating user information via records maintained by third party external resources 150 (e.g., credit score, biometric verification, etc.). Upon a successful authentication, the management system 130 may then remotely provide the prospective home buyer with physical access to the desired property via a communication with the property system 120 (e.g., by remotely unlocking a door or lock box included as part of the property system 120) and/or the user device 140 (e.g., by sending a digital key to the prospective home buyer's smartphone that is configured to unlock a door or lock box on the property). In a particular aspect of the disclosure, the property system 120 includes an interactive mobile robot and an array of cameras/sensors accessible to a remotely located real estate agent via the management system 130, wherein the mobile robot operates as a physical proxy for the agent, and wherein the array of cameras/sensors enable the agent to remotely monitor the property.

Exemplary Virtual Agent Methodology

Figure 2:
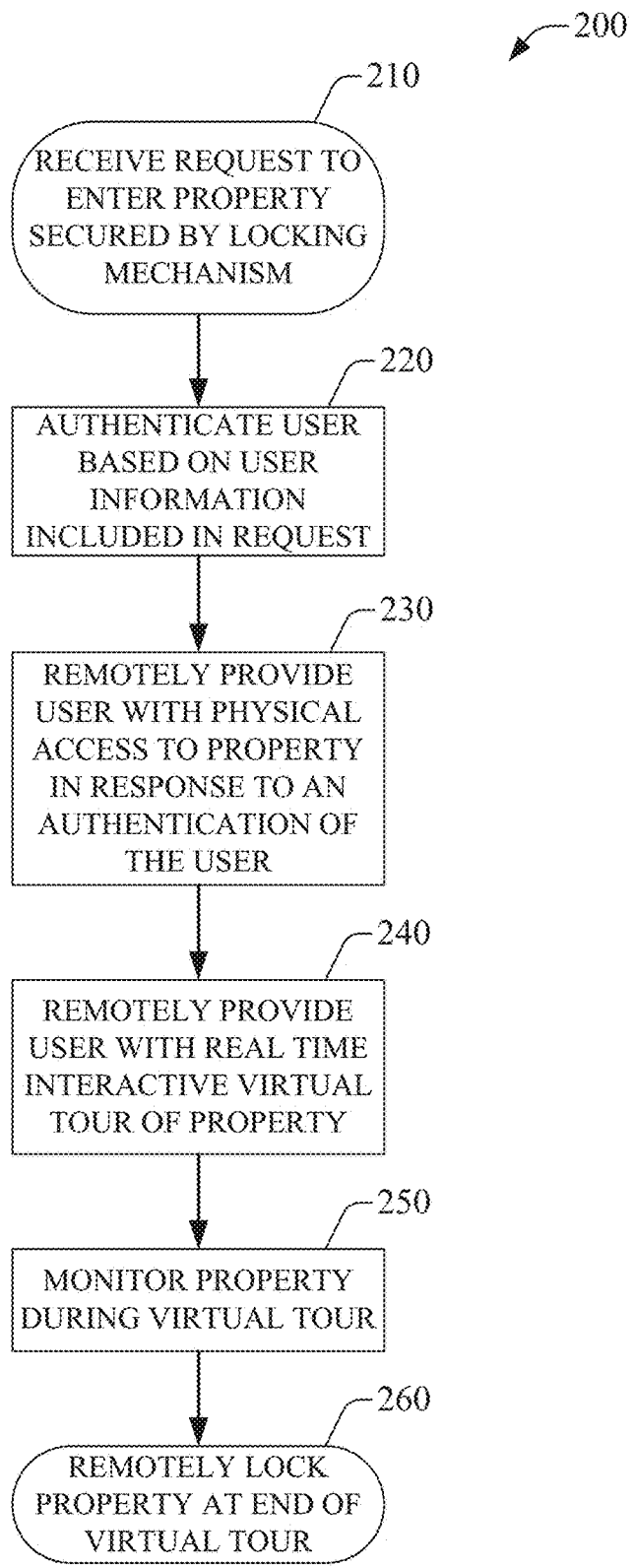
FIG. 2 is a flow diagram of an exemplary methodology that provides a virtual agent in accordance with an aspect of the subject specification.

Referring next to FIG. 2, a flow chart illustrating an exemplary method that provides a virtual agent according to an embodiment is provided. As illustrated, process 200 includes a series of acts that may be performed by a virtual agent system that includes at least one computing device (e.g., property system 120 and/or management system 130) according to an aspect of the subject specification. For instance, process 200 may be implemented by employing a processor to execute computer executable instructions stored on a computer readable storage medium to implement the series of acts. In another embodiment, a computer-readable storage medium comprising code for causing at least one computer to implement the acts of process 200 is contemplated.

Figure 3:
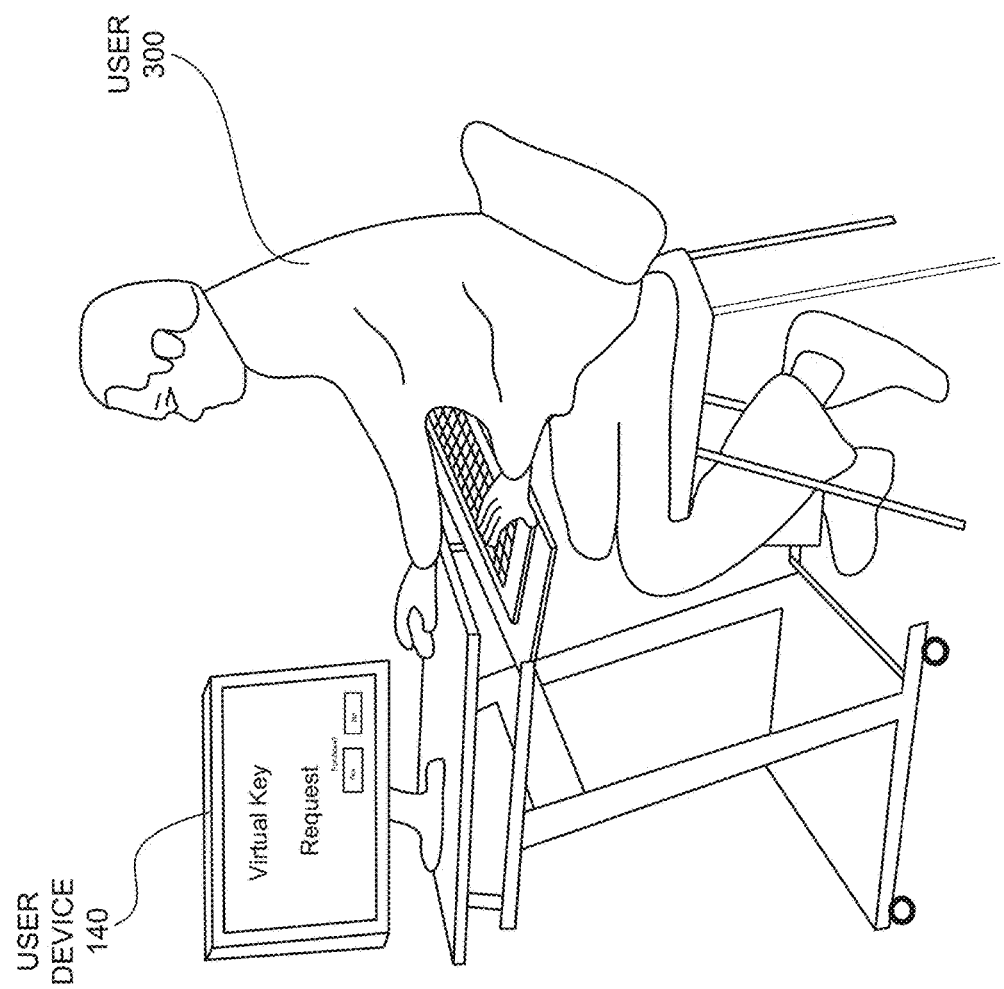
FIG. 3 illustrates a first exemplary transmission of a request to enter a property.
Figure 4:
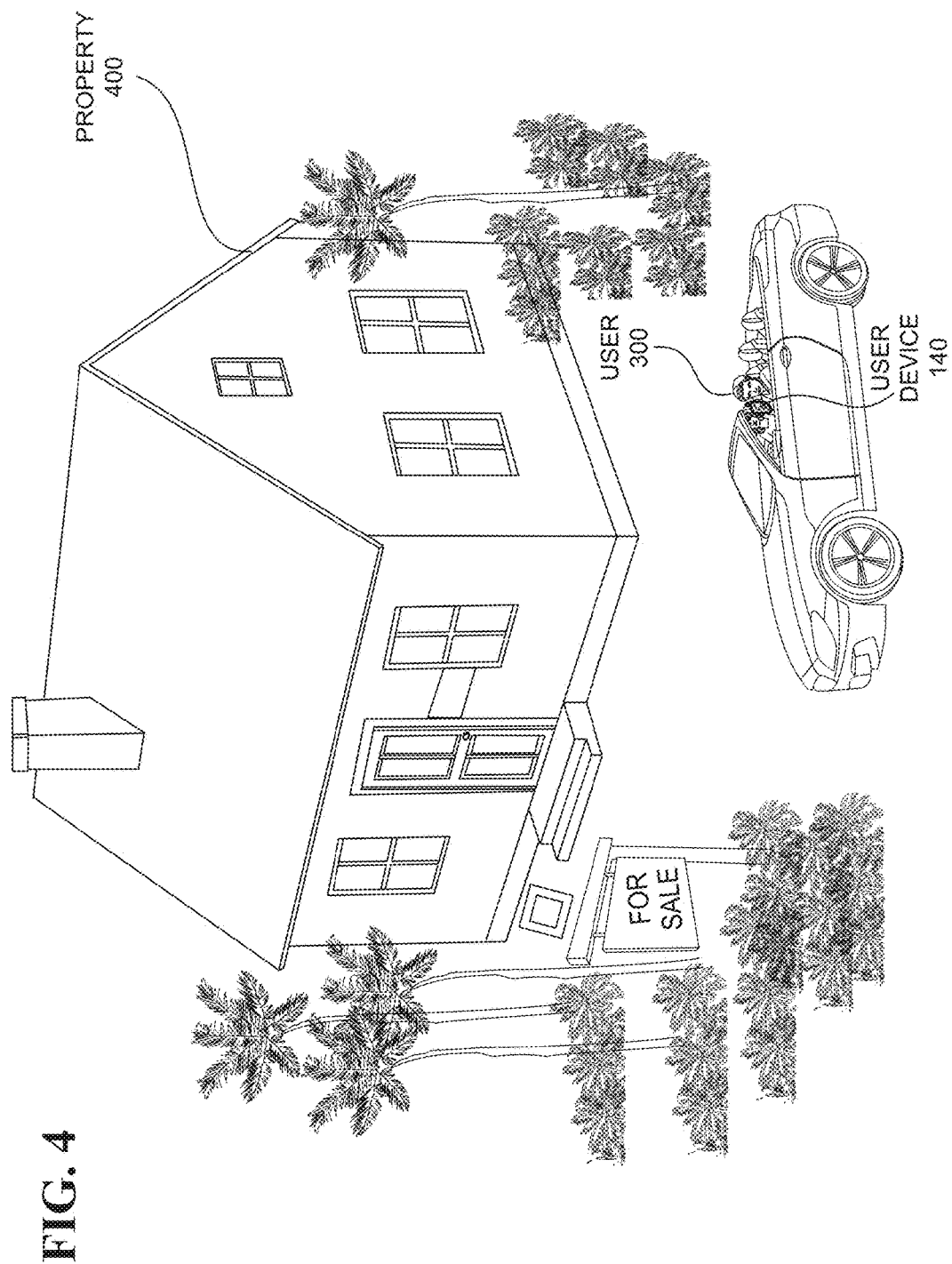
FIG. 4 illustrates a second exemplary transmission of a request to enter a property.
Figure 5:
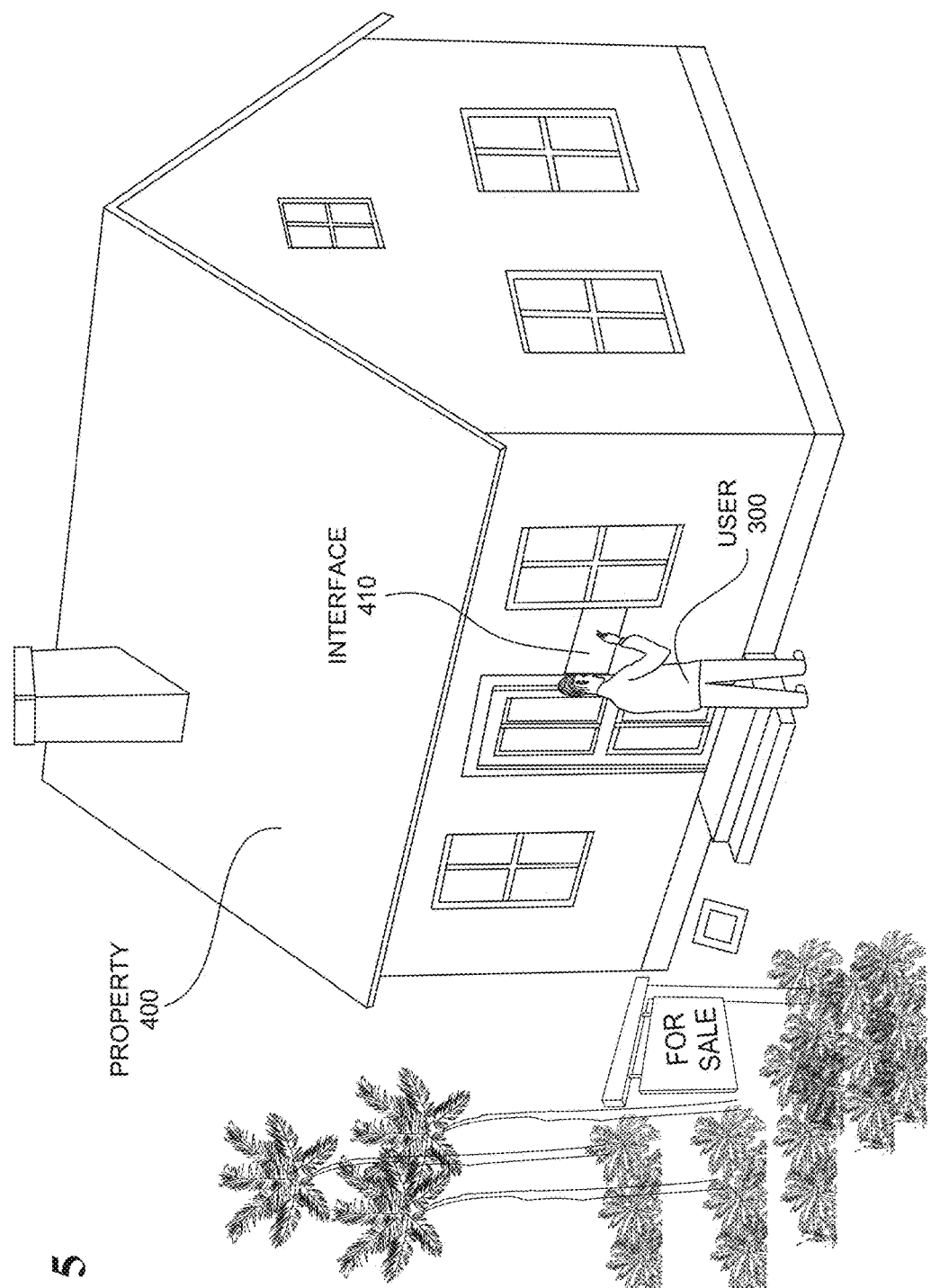
FIG. 5 illustrates a third exemplary transmission of a request to enter a property.

In an aspect, process 200 begins with the virtual agent system receiving a request to enter a property secured by a locking mechanism at act 210. Here, as illustrated in FIGS. 3-5, it is contemplated that a user 300 may submit such request via a user device 140 in any of a plurality of ways. For instance, as illustrated in FIG. 3, a user 300 may submit a request from their home or office, wherein user device 140 is a conventional desktop or laptop computer. As illustrated in FIG. 4, a user 300 may also submit a request while driving by the desired property 400, wherein user device 140 is a conventional smartphone or other mobile device. Alternatively, rather than utilizing a user device 140, it is contemplated that the desired property 400 itself may include an interface 410 (e.g., a Wi-Fi enabled touchscreen), as illustrated in FIG. 5, wherein the user 300 may input their request via the interface 410.

Providing the user 300 with a temporary Wi-Fi password which links the user 300 to a Wi-Fi network of the property 400 is also contemplated, in case the user 300 does not have a data plan or has poor reception on their mobile phone. Within such embodiment, the Wi-Fi password may be provided via user device 140 and/or interface 410 in response to a request to access the property 400.

It should also be appreciated that requests to access a property 400 may be received in various forms. For instance, in an exemplary embodiment, a user 300 may fill out a digital questionnaire via user device 140 and/or interface 410. In another embodiment, verbal requests to access a property 400 are also contemplated, wherein a user 300 may connect with a call center via user device 140 and/or interface 410 and speak directly to a live operator (e.g., via phone, live chat, etc.) and/or provide user information via an automated system.

Upon receiving a request to access a particular property 400, the virtual agent system then authenticates the user 300 at act 220. It is contemplated that such authentication may be based on user information included in the request, wherein user information may include any of various types of information associated with the user 300. For instance, user information may include personal information associated with the user 300 (e.g., phone number, home address, social security number, etc.), as well as biometric data associated with the user 300 (e.g., fingerprint submitted via user device 140, photo taken via interface 410, etc.), wherein the authenticating comprises analyzing the user information to ensure proper identification of the user 300.

In addition to identifying a user 300, it is contemplated that an authentication may further comprise determining whether the user 300 is a qualified purchaser of the property 400. Within such embodiment, user information may thus include financial information associated with the user 300 (e.g., employment history, salary information, etc.), wherein authenticating the user 300 may comprise confirming the veracity of such information (e.g., via external resources 150 such as financial institutions, credit reporting agencies, etc.) and determining whether the user 300 is a qualified purchaser of the property 400 (e.g., based on credit score, salary information, etc.).

In another aspect of the disclosure, rather than inputting sensitive personal information into a request, such information may be stored in a profile associated with the user 300. For instance, when requesting access to a property 400, a user 300 may simply input a username and password, wherein authenticating the user 300 comprises accessing the user's profile via their username and password. Here, it should be appreciated that such profiles could be maintained internally (e.g., within management system 130) and/or externally (e.g., within external resources 150).

Figure 6:
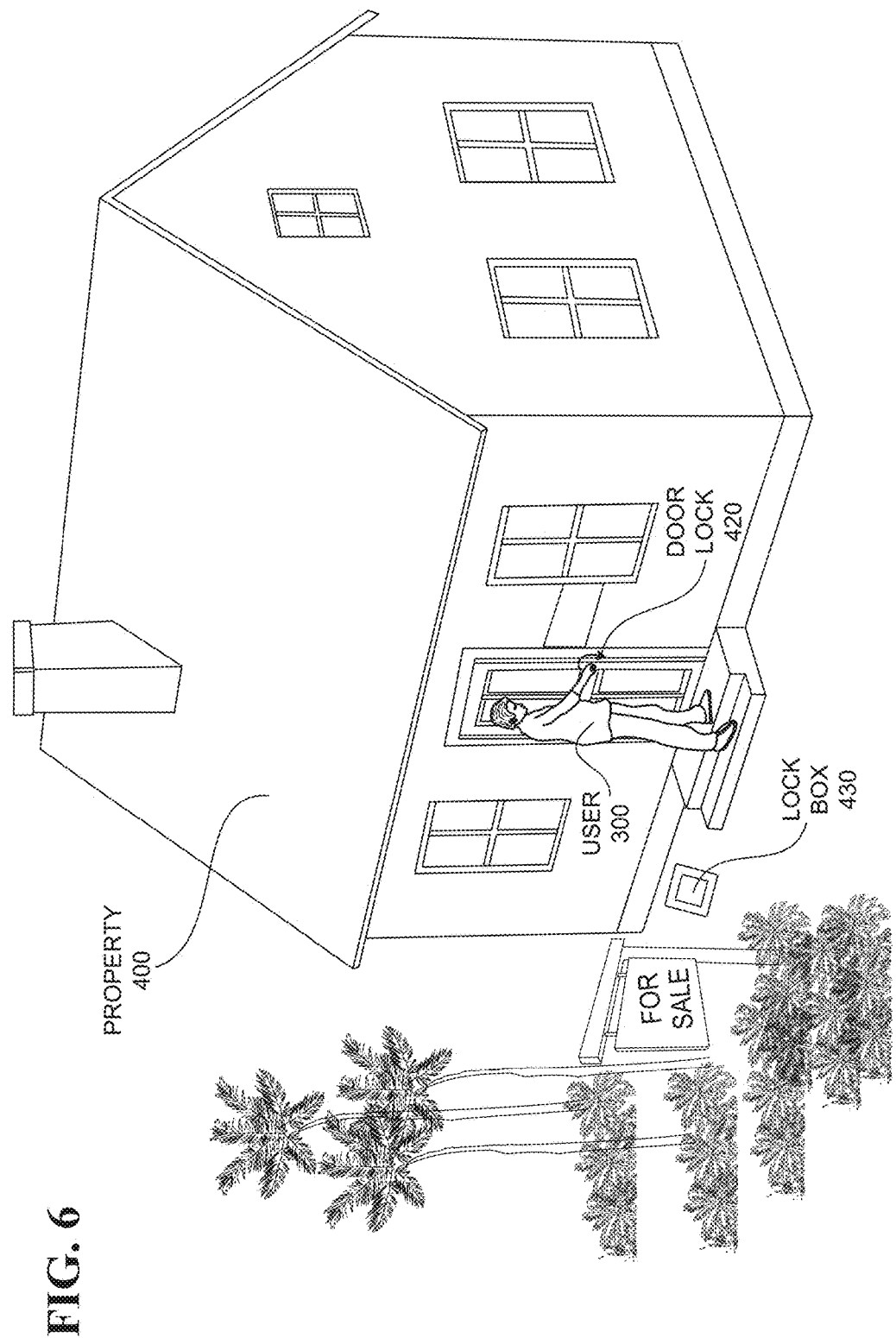
FIG. 6 illustrates exemplary locking mechanisms for a property in accordance with an aspect of the subject specification.
Figure 7:
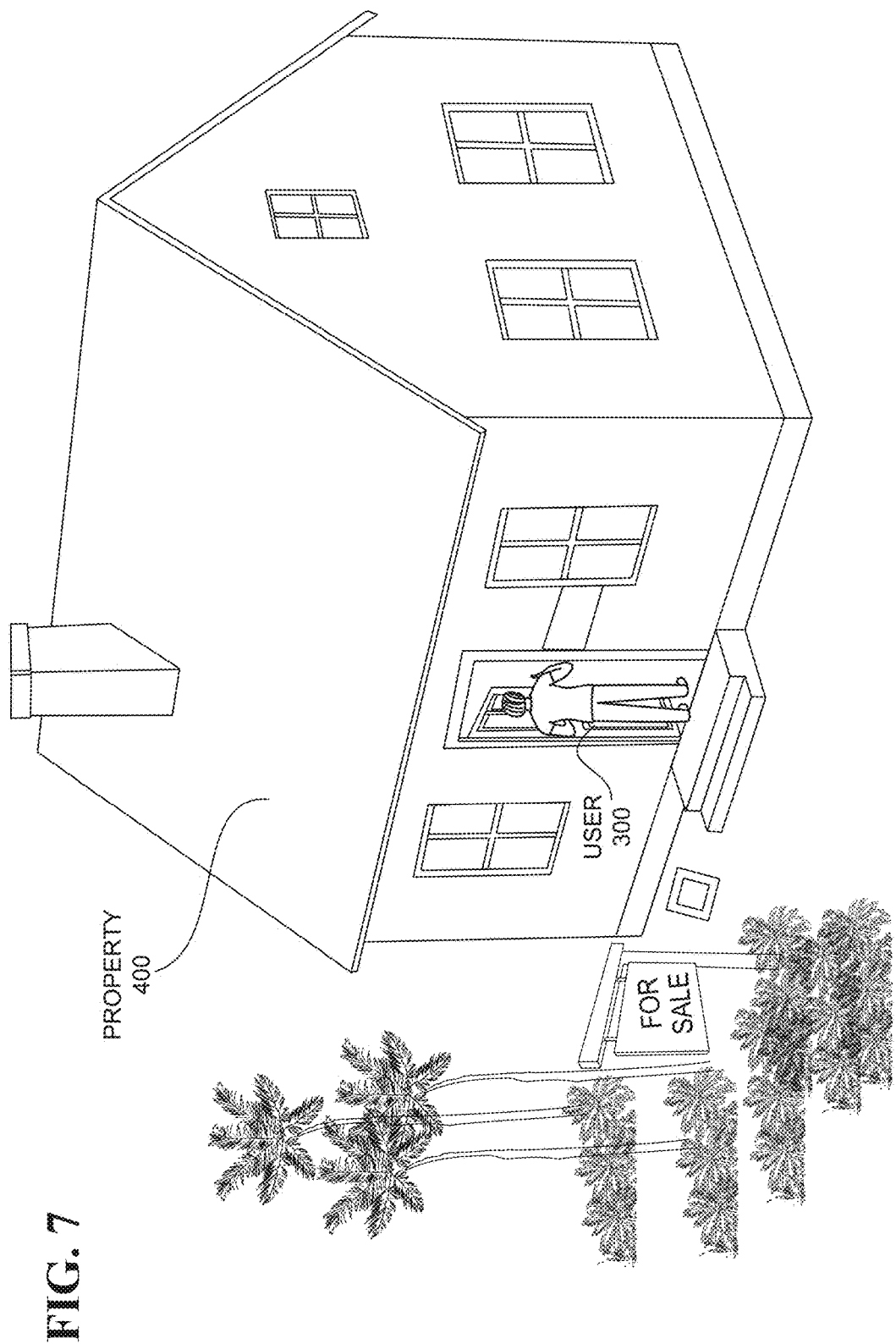
FIG. 7 illustrates a user entering a property in which physical access was provided in accordance with an aspect of the subject specification.

Once a user 300 is authenticated, process 200 proceeds to act 230 where physical access to the property is remotely provided. Here, providing such access may be conditioned upon receiving a signed consent form (e.g., via a digital signing platform provided by user device 140 and/or interface 410), wherein the user 300 consents to the parameters of the showing including being recorded. Actual access to the property 400 may then be provided in any of a plurality of ways. For instance, as illustrated in FIG. 6, a property 400 may include a door lock 420 and/or lock box 430. Here, upon a successful authentication of the user 300, it is contemplated that a remote entity (e.g., a real estate agent in his/her office) may then provide the user 300 with access to the property 400 by, for example, directly unlocking the door lock 420 and/or lock box 430, or sending the user 300 a digital key configured to unlock the door lock 420 and/or lock box 430. To this end, it should be appreciated that unlock mechanisms are well known in the art, such as the mechanisms disclosed in U.S. Pat. Nos. 5,204,672, 6,161, 005, and 6,005,306, each of which are incorporated herein by reference in their entirety. Once access is provided, the user 300 may then enter the property 400, as illustrated in FIG. 7.

Figure 8:
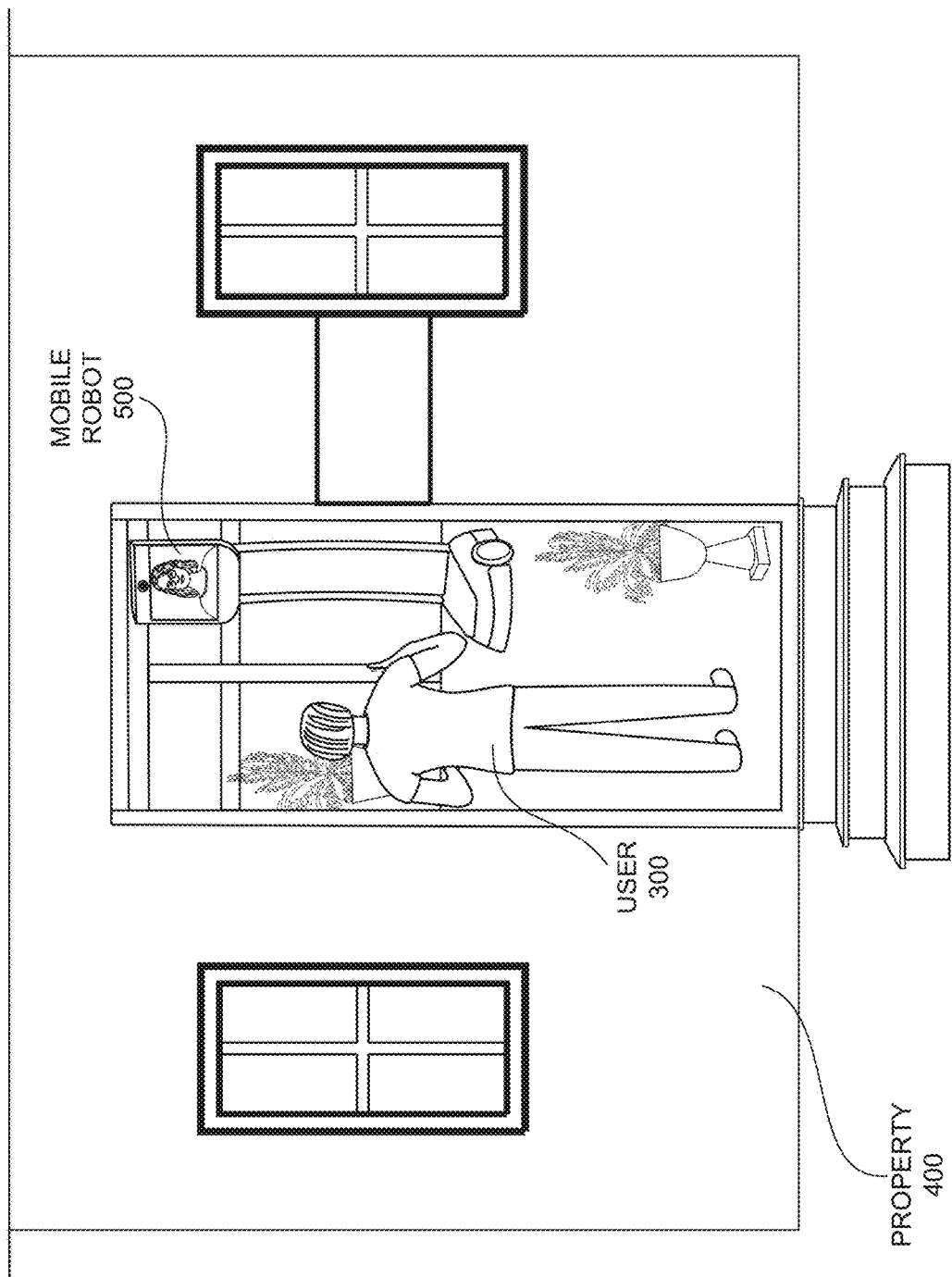
FIG. 8 illustrates an exemplary user interaction with a mobile robot in accordance with an aspect of the subject specification.
Figure 9:
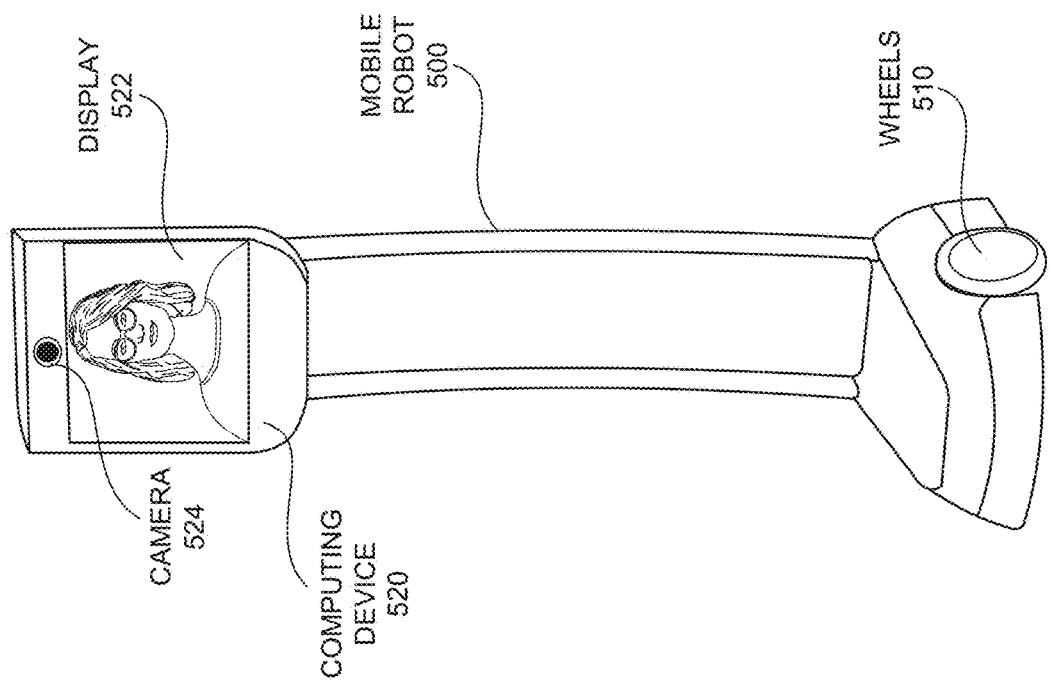
FIG. 9 illustrates an exemplary mobile robot in accordance with an aspect of the subject specification.

In a further aspect of the disclosure, an interactive virtual tour of the property 400 is contemplated at act 240. In a particular embodiment, the virtual tour is facilitated by a mobile robot 500, as illustrated in FIGS. 8-12. Upon entering the property 400, the user 300 may thus be greeted by a mobile robot 500, as illustrated in FIG. 8. An exemplary mobile robot 500 is provided in FIG. 9, wherein the mobile robot 500 comprises various components that enable the user 300 to interact with a remotely located real estate agent in real time as the user 300 tours the property 400. As illustrated, mobile robot 500 includes wheels 510 and a computing device 520 coupled to a display 522 and camera 524, which enable the user 300 to video conference with a remotely located real estate agent. Mobile robots are well known in the art, such as the BeamPro™ robot manufactured by Suitable Technologies® and disclosed in U.S. Patent Publication Nos. 2013/0265885, 2013/0343344, and 2013/0343352, each of which are incorporated herein by reference in their entirety.

Figure 10:
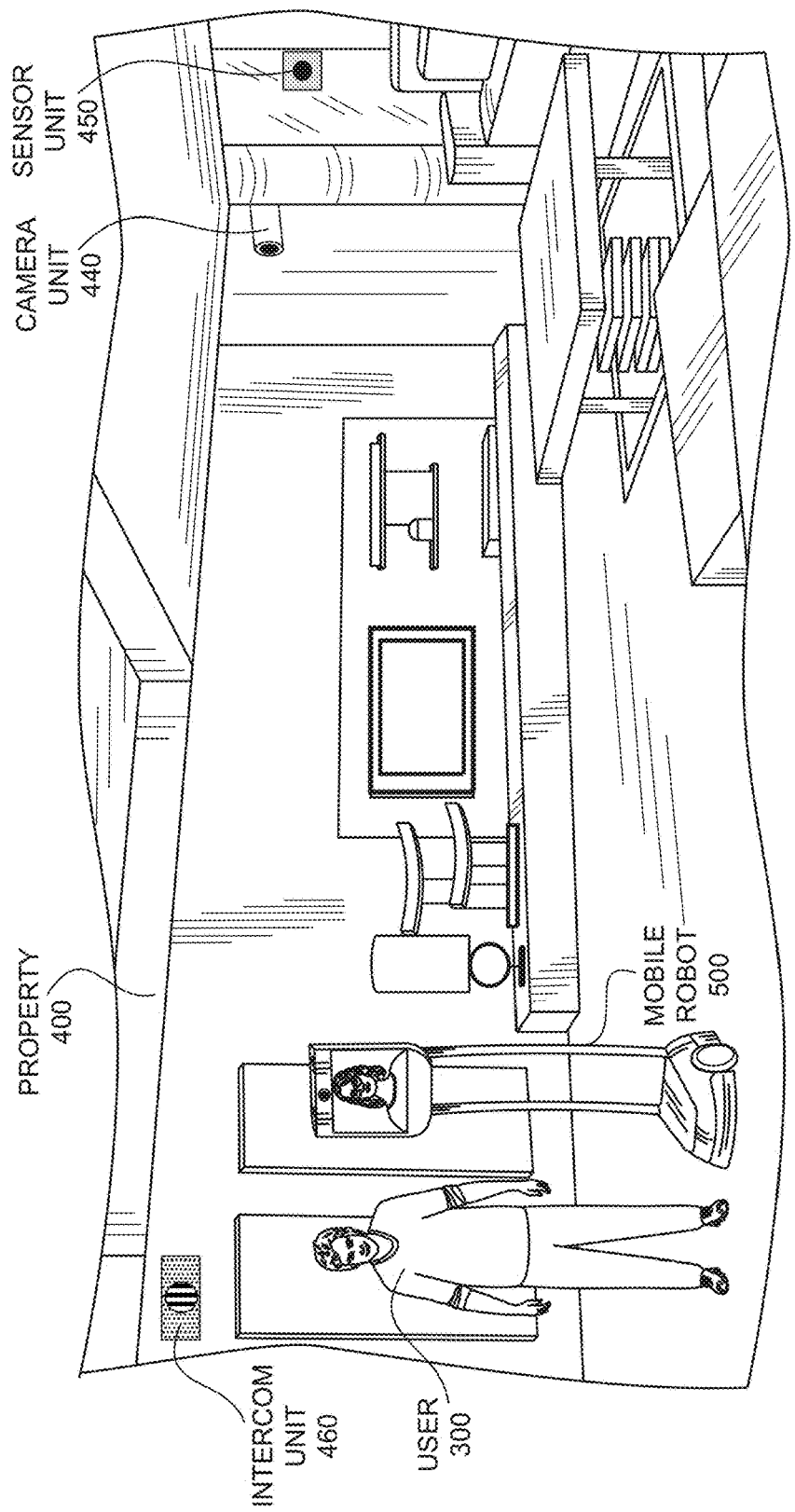
FIG. 10 illustrates a user in a first room of an exemplary virtual tour facilitated by a mobile robot in accordance with an aspect of the subject specification.
Figure 11:
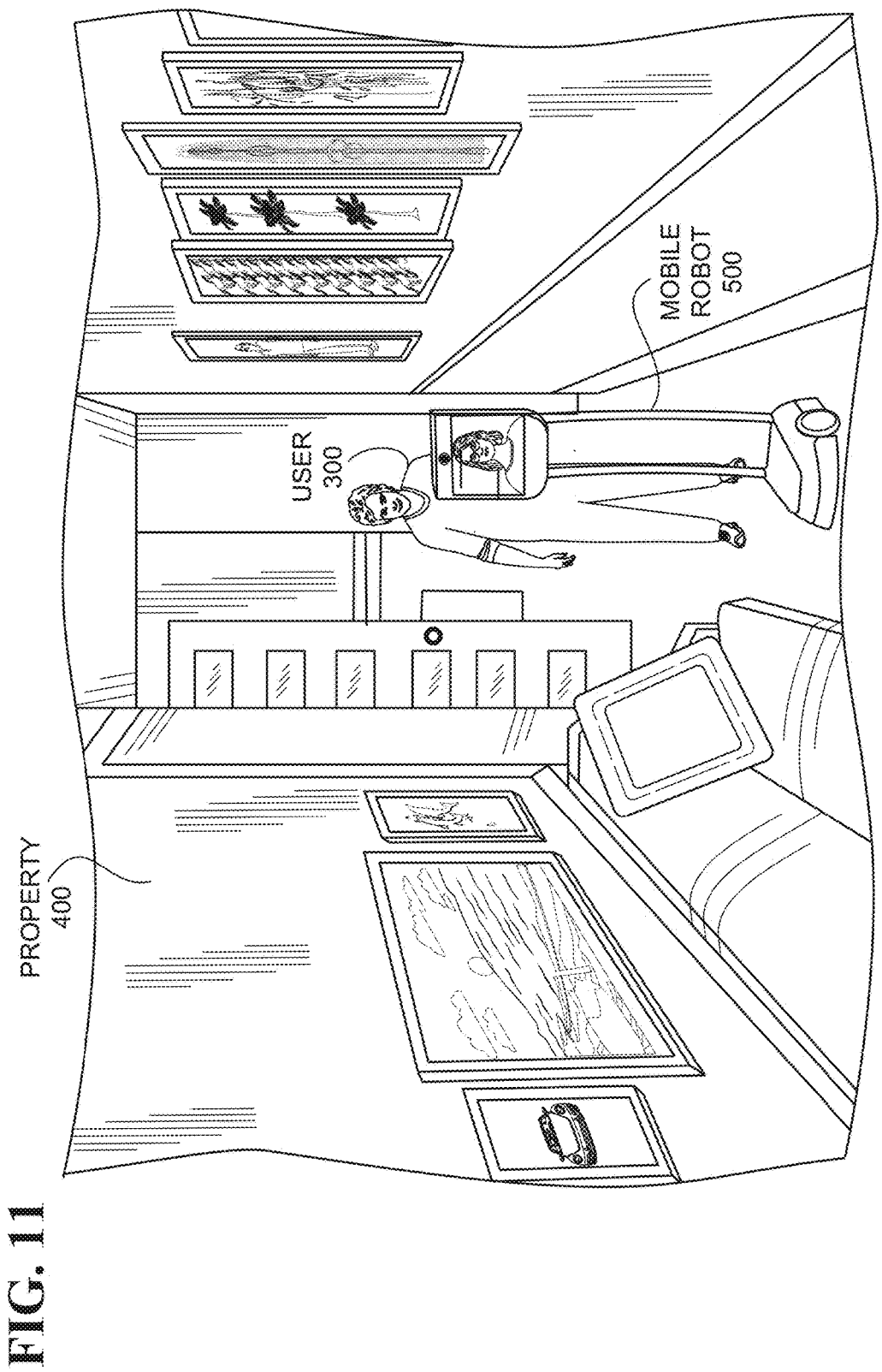
FIG. 11 illustrates a user in a hallway of an exemplary virtual tour facilitated by a mobile robot in accordance with an aspect of the subject specification.
Figure 12:
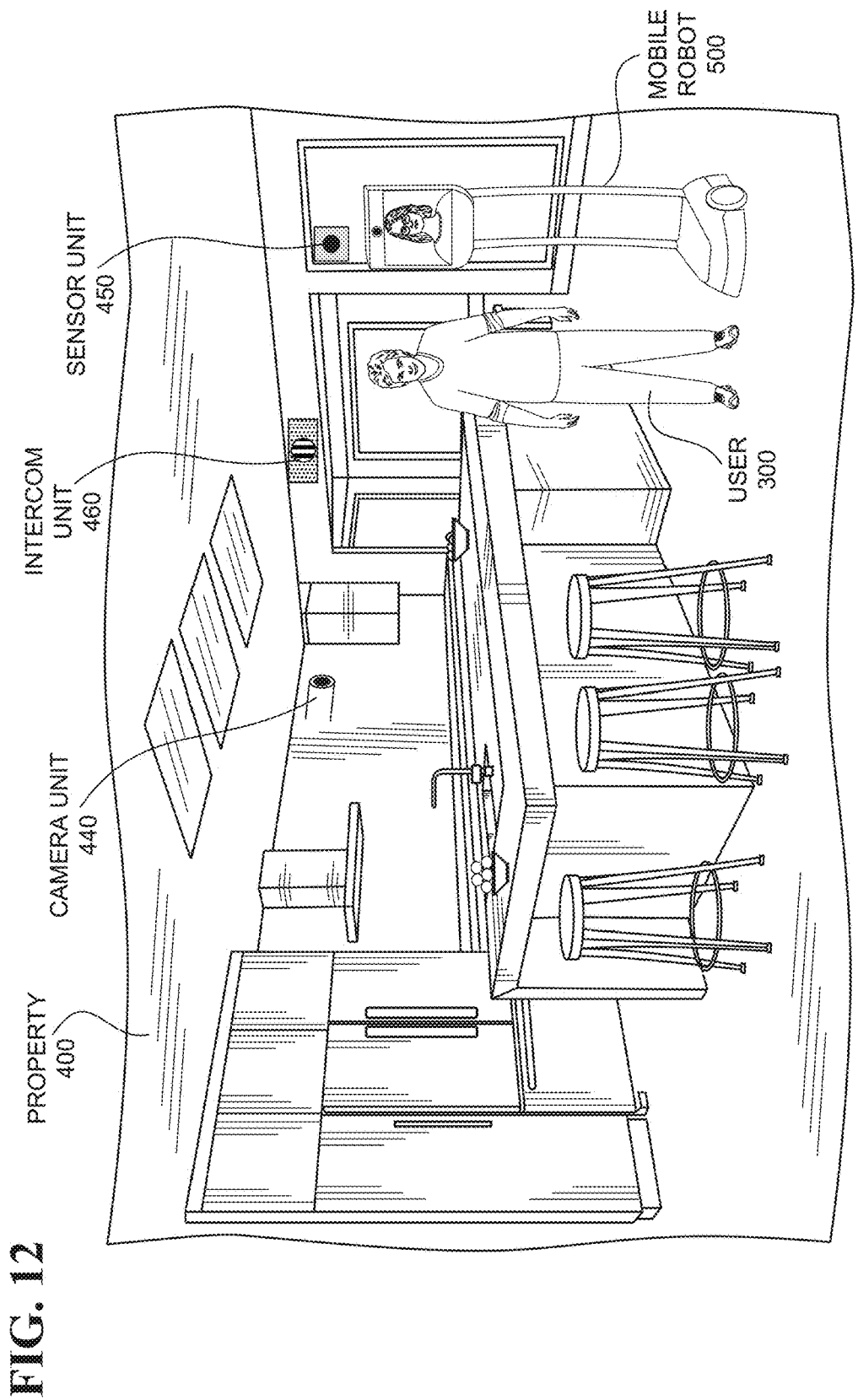
FIG. 12 illustrates a user in a second room of an exemplary virtual tour facilitated by a mobile robot in accordance with an aspect of the subject specification.

Referring next to FIGS. 10-12, an exemplary virtual tour of property 400 facilitated by mobile robot 500 is provided. As illustrated, such a tour may begin with a showing of the living room, as illustrated in FIG. 10, wherein the user 300 and mobile robot 500 subsequently travel through the hallway, as illustrated in FIG. 11, and then to the kitchen, as illustrated in FIG. 12. Here, throughout the tour, it should be appreciated that the remotely located real estate agent may continuously engage with the user 300 in real time via mobile robot 500. To this end, in addition to providing basic video conferencing capabilities, the mobile robot 500 may be further configured to instantly provide the user 300 with any of various types of information/documents associated with the property 400. For instance, in response to the user 300 asking about nearby schools, the remotely located real estate agent may upload relevant information (e.g., school boundary map, school district ratings, etc.) which then appears on display 522 of the mobile robot 500. Display 522 may also be configured as a touchscreen, wherein the user 300 may manually input queries and/or navigate through a series of preloaded pages associated with the property 400.

In another aspect of the disclosure, the virtual agent system may be configured to automatically prioritize data associated with the property 400 based on information about the user 300 ascertained by the system. For instance, based on a user's profile (e.g., parent of two young children), the system may infer that the user 300 would be interested in learning more about the local schools. In this scenario, information about the local schools (e.g., school boundary map, school district ratings, etc.) might be prioritized over other types of information (e.g., map of local bars) and preloaded into the system before the user 300 requests it. Moreover, rather than passively waiting for the user 300 to request school information, the remotely located real estate agent may be prompted by the system to volunteer such information, and/or the information may be preloaded onto the mobile robot 500 where it is instantly available to the user 300.

In a further aspect of the disclosure, it is contemplated that the property 400 will be continuously monitored throughout the duration of a virtual tour. Accordingly, referring back to process 200, such monitoring is represented by act 250, wherein the property 400 may be equipped with various components to facilitate the monitoring. For instance, the property 400 may be equipped with an array of Wi-Fi enabled cameras and sensors (e.g., motion sensors, door/window sensors, etc.) that may be monitored by the remotely located real estate agent. As illustrated in FIGS. 10 and 12, for example, a camera unit 440 may include a first camera in the living room and a second camera in the kitchen, whereas a sensor unit 450 may include a first sensor in the living room and a second sensor in the kitchen. Once the virtual tour is over, process 200 concludes at act 260 with the remotely located real estate agent locking the property 400. Here, before actually locking the property 400, the remotely located real estate agent may first confirm via the camera unit 440 and/or the sensor unit 450 that the user 300 and anyone accompanying the user 300 has indeed vacated the property 400. It should also be noted that remotely locking the property 400 may be achieved in a manner substantially similar to the aforementioned mechanism for unlocking door lock 420 and lock box 430.

Rather than utilizing a mobile robot 500 to facilitate a virtual tour as described herein, any of various other devices and systems may be used instead. For instance, an intercom unit 460 is contemplated, wherein the remotely located real estate agent communicates with the user 300 via the intercom unit 460, and monitors the user 300 via the camera unit 440 and sensor unit 450. Within such embodiment, the intercom unit 460 may comprise an array of units placed in various rooms of the property 400.

Figure 13:
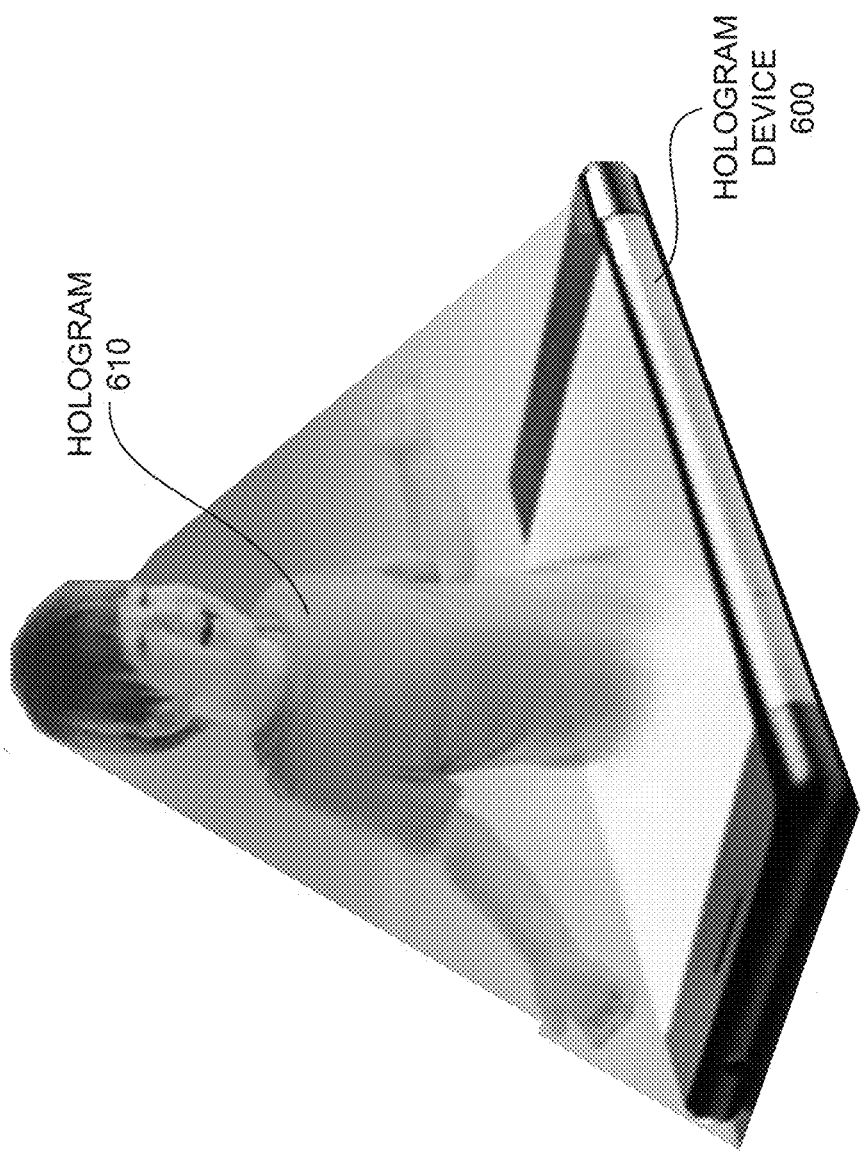
FIG. 13 illustrates an exemplary hologram device in accordance with an aspect of the subject specification.
Figure 14:
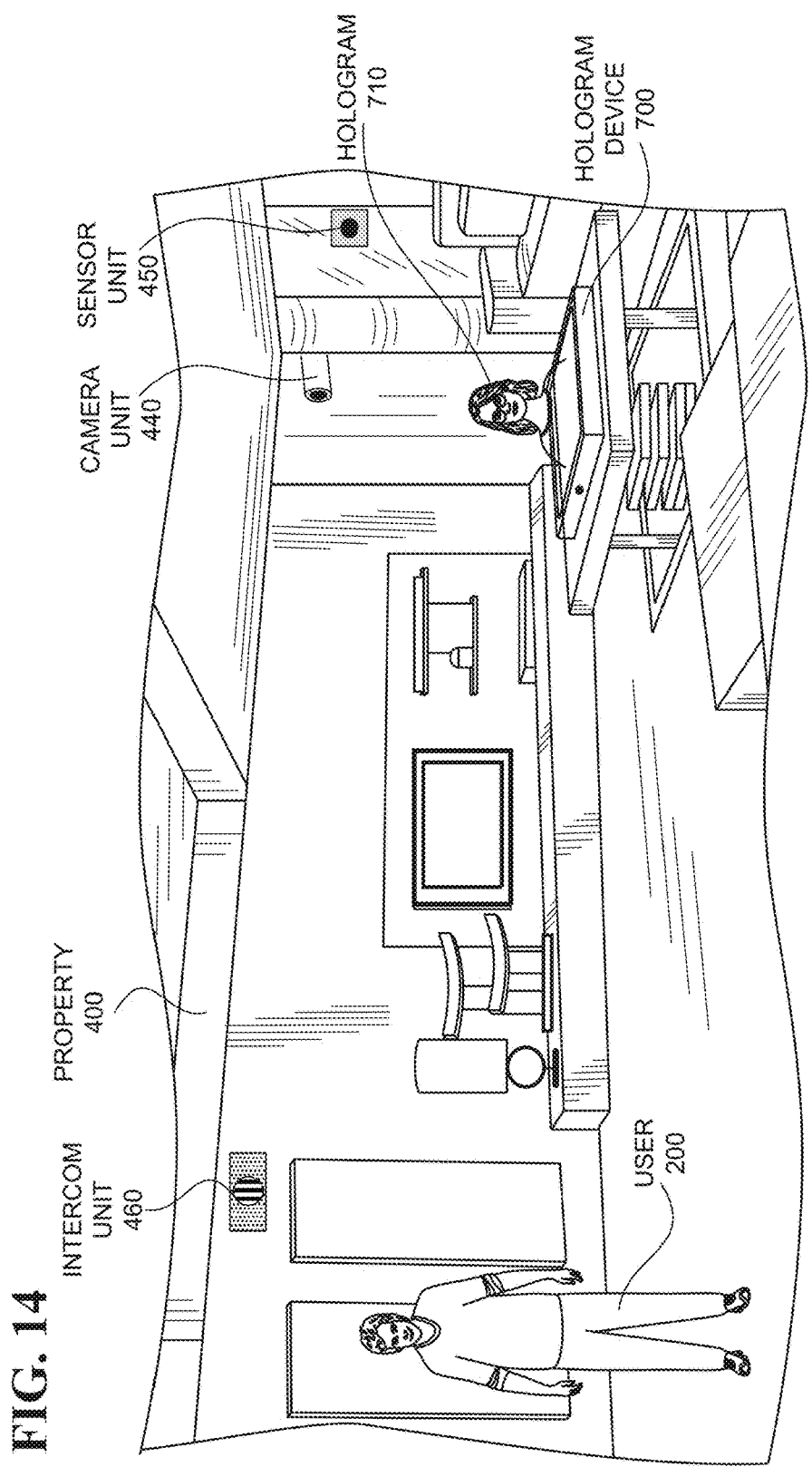
FIG. 14 illustrates a user in a first room of an exemplary virtual tour facilitated by a hologram device in accordance with an aspect of the subject specification.
Figure 15:
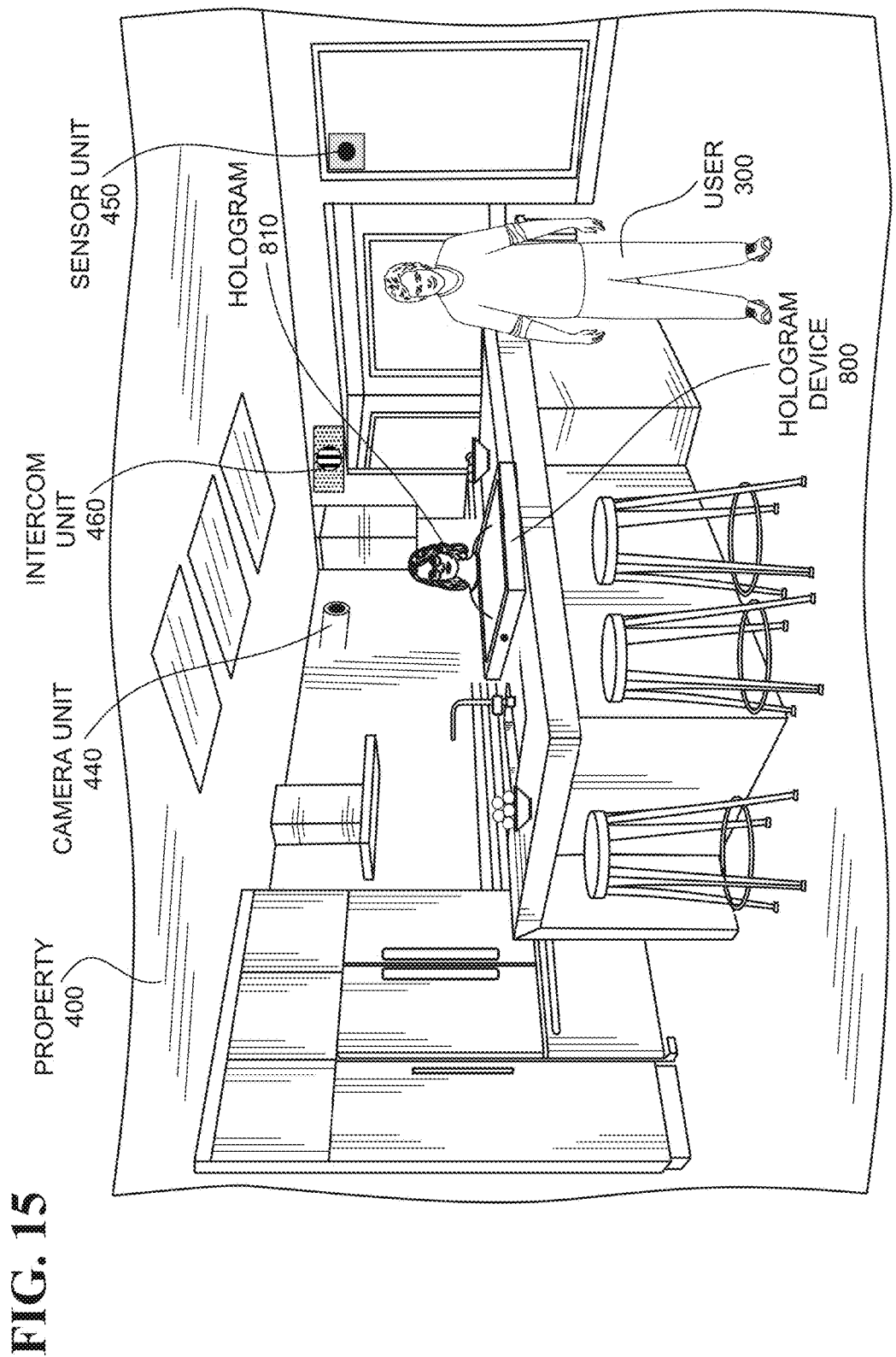
FIG. 15 illustrates a user in a second room of an exemplary virtual tour facilitated by a hologram device in accordance with an aspect of the subject specification.

A virtual agent may also appear to a user 300 via holograms. Within such embodiment, an array of hologram devices may be placed in various rooms of the property, wherein the user 300 may interact with the remotely located real estate agent via the hologram devices. An exemplary hologram device is provided in FIG. 13. As illustrated, a hologram device 600 may be any of various devices known in the art, which can be configured to project a hologram 610. In FIG. 13, hologram device 600 is illustrated as a smartphone, although a tablet or any of various other devices known in the art may be used. Examples of hologram technology are disclosed in U.S. Patent Publication No. 2015/0220058 and U.S. Pat. No. 5,865,519, each of which are incorporated herein by reference in their entirety. To facilitate a virtual tour as disclosed herein, an array of hologram devices may thus be placed in various rooms, wherein the remotely located agent appears to the user 300 as a hologram. For instance, as illustrated in FIGS. 14-15, a first hologram device 700 may be placed in the living room, which projects a first hologram 710 of the agent, whereas a second hologram device 800 may be placed in the kitchen, which projects a second hologram 810 of the agent. The user 300 may thus interact with the remotely located agent via the first hologram 710 while in the living room, and subsequently interact with the agent via the second hologram 810 while in the kitchen.

In another aspect of the disclosure, it is contemplated that three dimensional virtual models of the property 400 (e.g., three dimensional models provided by Matterport® or other companies known in the art) may be used to improve the user 300 experience and/or assist the remotely located agent. For instance, prior to granting the user 300 access to the property 400, the system may provide the user 300 with a three dimensional interior model of the property 400 which may be viewed on user device 140 or interface 410, for example. The user 300 may then determine whether to proceed with the physical access request based on the three dimensional virtual tour. With respect to the remotely located agent, three dimensional models of the property 400 may be used as a point of reference throughout the virtual tour to facilitate viewing blind spots, mapping a path for the virtual tour, etc.

Exemplary Virtual Agent System

Figure 16:
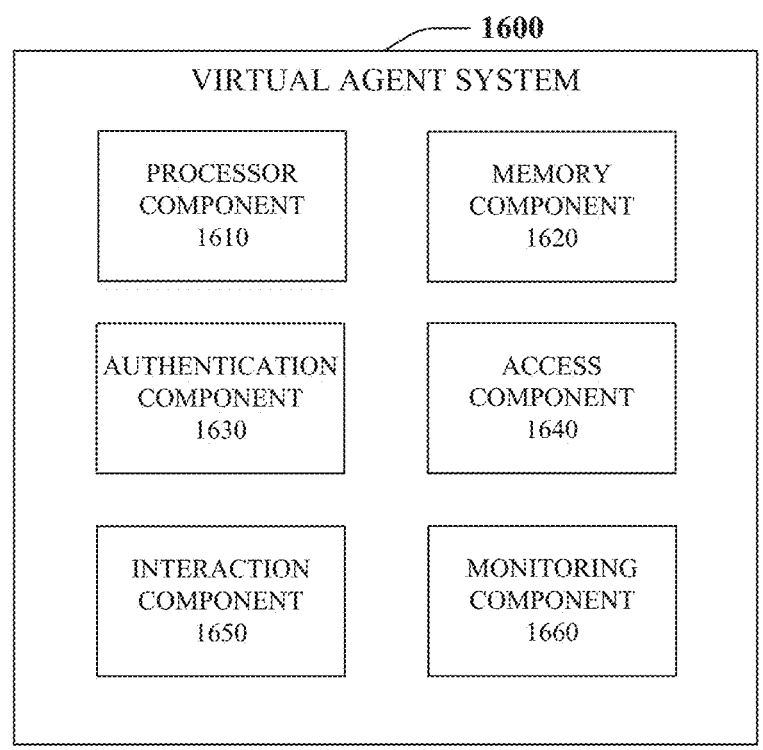
FIG. 16 is a block diagram illustrating exemplary components of a virtual agent system in accordance with an aspect of the subject specification.

FIG. 16 shows a block diagram of an exemplary virtual agent system 1600 which facilitates various aspects disclosed herein. As shown in FIG. 16, virtual agent system 1600 may include a processor component 1610, a memory component 1620, an authentication component 1630, an access component 1640, an interaction component 1650, and a monitoring component 1660. Components 1610-1660 may reside together in a single location or separately in different locations in various combinations, including, for example, a configuration in which any of the aforementioned components reside in a cloud. For instance, with reference to FIG. 1, it is contemplated that these components may reside, alone or in combination, in any of property system 120, management system 130, user device 140, and/or external resources 150.

In one aspect, processor component 1610 is configured to execute computer-readable instructions related to performing any of a plurality of functions. Processor component 1610 can be a single processor or a plurality of processors which analyze and/or generate information utilized by memory component 1620, authentication component 1630, access component 1640, interaction component 1650, and/or monitoring component 1660. Additionally or alternatively, processor component 1610 may be configured to control one or more components of virtual agent system 1600.

In another aspect, memory component 1620 is coupled to processor component 1610 and configured to store computer-readable instructions executed by processor component 1610. Memory component 1620 may also be configured to store any of a plurality of other types of data including data generated by any of authentication component 1630, access component 1640, interaction component 1650, and/or monitoring component 1660. Memory component 1620 can be configured in a number of different configurations, including as random access memory, battery-backed memory, Solid State memory, hard disk, magnetic tape, etc. Various features can also be implemented upon memory component 1620, such as compression and automatic back up (e.g., use of a Redundant Array of Independent Drives configuration). In one aspect, the memory may be located on a network, such as a "cloud storage" solution.

As illustrated, virtual agent system 1600 may also comprise authentication component 1630, which is configured to authenticate a user based on user information included in a request to enter a property secured by a locking mechanism. Here, it is contemplated that authentication component 1630 may be configured to authenticate a user based on any of various types of information associated with a user including, for example, personal information associated with the user (e.g., phone number, home address, social security number, etc.), as well as biometric data associated with the user (e.g., fingerprint submitted via a user device 140, photo taken via interface 410, etc.), wherein authentication component 1630 is further configured to analyze the user information to ensure proper identification of the user.

In addition to identifying a user, it is contemplated that authentication component 1630 may be configured to determine whether a user is a qualified purchaser of a property. Within such embodiment, user information may thus include financial information associated with the user (e.g., employment history, salary information, etc.), wherein authentication component 1630 may be configured to confirm the veracity of such information (e.g., via external resources 150 such as financial institutions, credit reporting agencies, etc.) and determine whether the user is a qualified purchaser of the property (e.g., based on credit score, salary information, etc.).

In another aspect of the disclosure, authentication component 1630 may be configured to retrieve information stored in a profile associated with the user. Indeed, as previously stated, a user may simply input a username and password when requesting access to a property, wherein authentication component 1630 is configured to access the user's profile via their username and password. Such profiles could be maintained internally (e.g., within management system 130) and/or externally (e.g., within external resources 150).

As illustrated in FIG. 16, virtual agent system 1600 may also comprise access component 1640, which is configured to provide the user with physical access to the property in response to an authentication of the user. Here, it should be appreciated that access component 1640 is configured to provide such physical access via remote control. For instance, access component 1640 may include a door lock 420 and/or lock box 430, as illustrated in FIG. 6. Within such embodiment, upon a successful authentication of a user, it is contemplated that access component 1640 may be configured to enable a remote entity (e.g., a real estate agent in his/her office) to provide the user with access to the property by, for example, directly unlocking the door lock 420 and/or lock box 430, or sending the user a digital key configured to unlock the door lock 420 and/or lock box 430.

Virtual agent system 1600 may further comprise interaction component 1650, which is configured to provide the user with a virtual tour of the property. It is contemplated that such virtual tour comprises a remote real time interaction with the user during the physical access of the property. In a particular embodiment, interaction component 1650 comprises a mobile robot, such as mobile robot 500 illustrated in FIGS. 8-12, wherein the virtual tour is facilitated by the mobile robot according to the aspects previously disclosed herein. In another embodiment, interaction component 1650 comprises an array of hologram devices, such as hologram devices 700 and 800 respectively illustrated in FIGS. 14 and 15, wherein the virtual tour is facilitated by the hologram devices according to the aspects previously disclosed herein. In yet another embodiment, interaction component 1650 comprises an array of intercom devices, such as intercom unit 460 illustrated in FIGS. 10, 12, 14, and 15, wherein the virtual tour is facilitated by the intercom devices according to the aspects previously disclosed herein.

Virtual agent system 1600 may also comprise monitoring component 1660, which is configured to monitor the property during the virtual tour. For instance, monitoring component 1660 may comprise an array of Wi-Fi enabled cameras and sensors (e.g., motion sensors, door/window sensors, etc.), which may be monitored by a remotely located real estate agent. As illustrated in FIGS. 10 and 12, for example, a camera unit 440 may include a first camera in the living room and a second camera in the kitchen, whereas a sensor unit 450 may include a first sensor in the living room and a second sensor in the kitchen. Once the virtual tour is over, access component 1640 may then be utilized by the remotely located real estate agent to lock the property in a manner substantially similar to the aforementioned mechanism for unlocking door lock 420 and lock box 430.

Exemplary User-Agent Matching Environment

Figure 17:
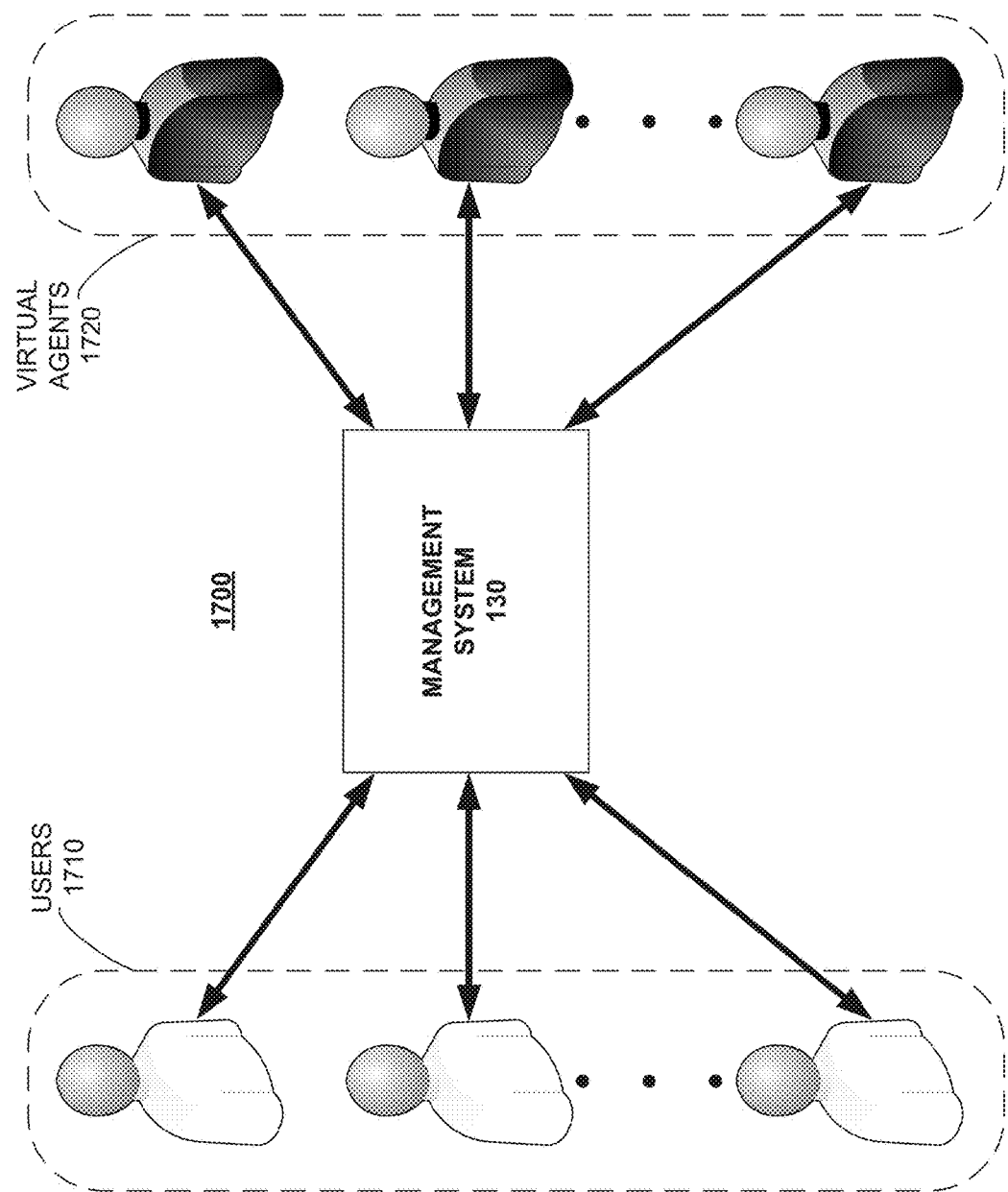
FIG. 17 illustrates an exemplary environment that facilitates matching users with virtual tour host agents in accordance with an aspect of the subject specification.

In another aspect of the disclosure, a system and methodology for matching users with virtual agents via an automated "call center" is contemplated. In FIG. 17, an exemplary environment that facilitates such matching in accordance with an aspect of the subject specification is provided. As illustrated, environment 1700 includes a management system 130 configured to match users 1710 with particular virtual agents 1720. Here, it should be appreciated that matching users 1710 with virtual agents 1720 may comprise having management system 130 utilize any of the components included in environment 100 illustrated in FIG. 1. For instance, it is contemplated that management system 130 may be configured to receive requests to access a property from users 1710 via a user device 140 and/or interface 410 included as part of property system 120. It is further contemplated that external resources 150 may represent a plurality of devices respectively associated with each of virtual agents 1720, wherein management system 130 is configured to register virtual agents 1720 based on an authentication of virtual agent applications received via external resources 150.

Exemplary User-Agent Matching Methodology

Figure 18:
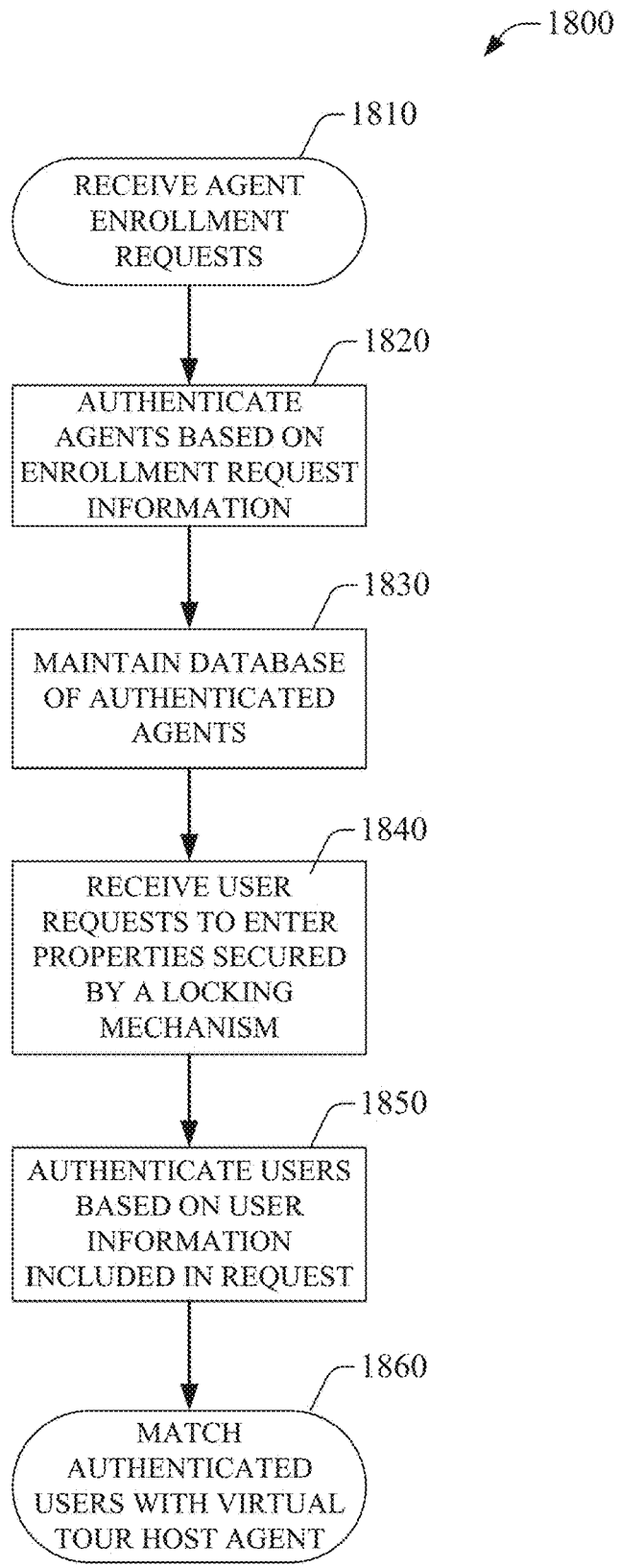
FIG. 18 is a flow diagram of an exemplary methodology that facilitates matching users with virtual tour host agents in accordance with an aspect of the subject specification.

Referring next to FIG. 18, a flow chart illustrating an exemplary method that facilitates matching users with virtual tour host agents according to an embodiment is provided. As illustrated, process 1800 includes a series of acts that may be performed by a management system that includes at least one computing device (e.g., management system 130) according to an aspect of the subject specification. For instance, process 1800 may be implemented by employing a processor to execute computer executable instructions stored on a computer readable storage medium to implement the series of acts. In another embodiment, a computer-readable storage medium comprising code for causing at least one computer to implement the acts of process 1800 is contemplated.

In an aspect, process 1800 begins with the management system 130 receiving agent enrollment requests from agents at act 1810. At act 1820, agents are then authenticated based on agent information included in agent enrollment applications (e.g., by analyzing biometric data associated with the agent), wherein a database of authenticated agents is then maintained at act 1830. Here, it should be appreciated that the maintaining at act 1830 may include indexing agents based on information included in the agent enrollment applications (e.g., based on language spoken, level of experience, availability, review history, etc.).

At act 1840, the management system 130 then receives requests from users to enter properties secured by a locking mechanism in a manner substantially similar to act 210 of process 200. After receiving a request to access a property, the management system 130 then authenticates the user at act 1850 in a manner substantially similar to act 220 of process 200. Process 1800 then concludes at act 1860 where authenticated users are matched with a corresponding virtual tour host agent, wherein the matching may comprise matching authenticated users with a host agent based on the aforementioned agent indexing (e.g., based on language spoken, level of experience, availability, review history, etc.).

Figure 19:
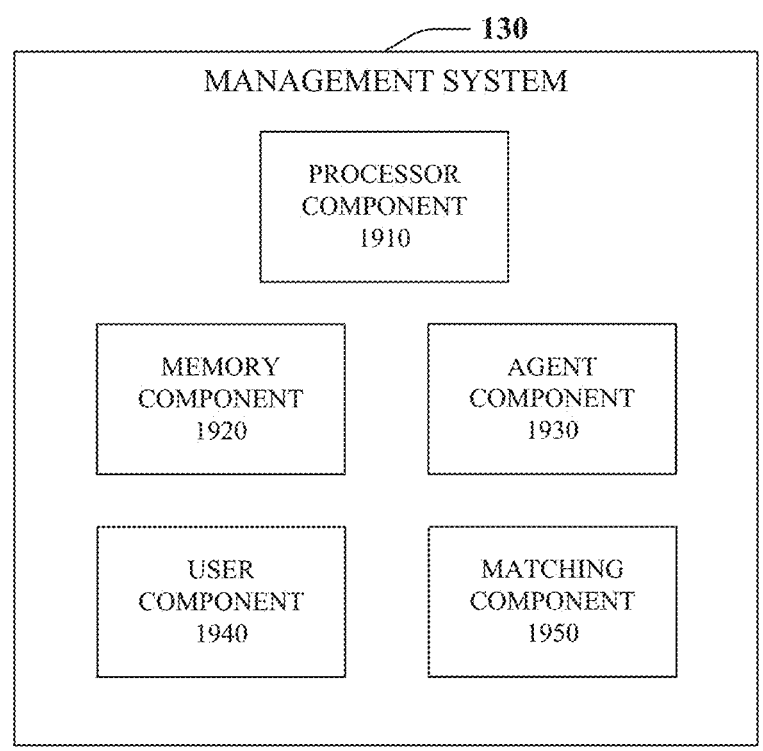
FIG. 19 is a block diagram illustrating exemplary components of a management system in accordance with an aspect of the subject specification.

Referring next to FIG. 19, a block diagram of an exemplary management system 130 which facilitates matching users with virtual tour host agents in accordance with a disclosed aspect. As illustrated, management system 130 may include a processor component 1910, a memory component 1920, an agent component 1930, a user component 1940, and a monitoring component 1950. Components 1910-1950 may reside together in a single location or separately in different locations in various combinations, including, for example, a configuration in which any of the aforementioned components reside in a cloud.

Similar to processor component 1610 in virtual agent system 1600, processor component 1910 is configured to execute computer-readable instructions related to performing any of a plurality of functions. Processor component 1910 can be a single processor or a plurality of processors which analyze and/or generate information utilized by memory component 1920, agent component 1930, user component 1940, and/or monitoring component 1950. Additionally or alternatively, processor component 1910 may be configured to control one or more components of management system 130.

In another aspect, memory component 1920 is coupled to processor component 1910 and configured to store computer-readable instructions executed by processor component 1910. Memory component 1920 may also be configured to store any of a plurality of other types of data including data generated by any of agent component 1930, user component 1940, and/or monitoring component 1950. Here, it should be noted that memory component 1920 is analogous to memory component 1620 in virtual agent system 1600. Accordingly, it should be appreciated that any of the aforementioned features/configurations of memory component 1620 are also applicable to memory component 1920.

As illustrated, management system 130 may also include agent component 1930, user component 1940, and matching component 1950. For this particular embodiment, agent component 1930 is configured to maintain a database of virtual agents in which each of the virtual agents are remotely located from a property secured by a locking mechanism. User component 1940 is then configured to authenticate a user based on user information included in a request to enter the property, whereas matching component 1950 is configured to match an authenticated user with a host agent of a virtual tour. Here, it should be appreciated that the host agent is selected from the database of virtual agents, and the virtual tour comprises a remote real time interaction between the user and the host agent while the user physically accesses the property.

In a further aspect of the disclosure, agent component 1930 may be configured to authenticate agents based on agent information included in agent enrollment applications (e.g., by analyzing biometric data associated with the agent included in the enrollment application) such that the database of virtual agents is limited to authenticated agents. Agent component 1930 may also be configured to index agents based on information included in agent enrollment applications (e.g., language spoken, level of experience, availability, review history, etc.), wherein matching component 1950 may then be configured to match the authenticated user with the host agent based on an indexing of the virtual agents.

Exemplary Networked and Distributed Environments

One of ordinary skill in the art can appreciate that various embodiments for implementing the use of a computing device and related embodiments described herein can be implemented in connection with any computer or other client or server device, which can be deployed as part of a computer network or in a distributed computing environment, and can be connected to any kind of data store. Moreover, one of ordinary skill in the art will appreciate that such embodiments can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 20:
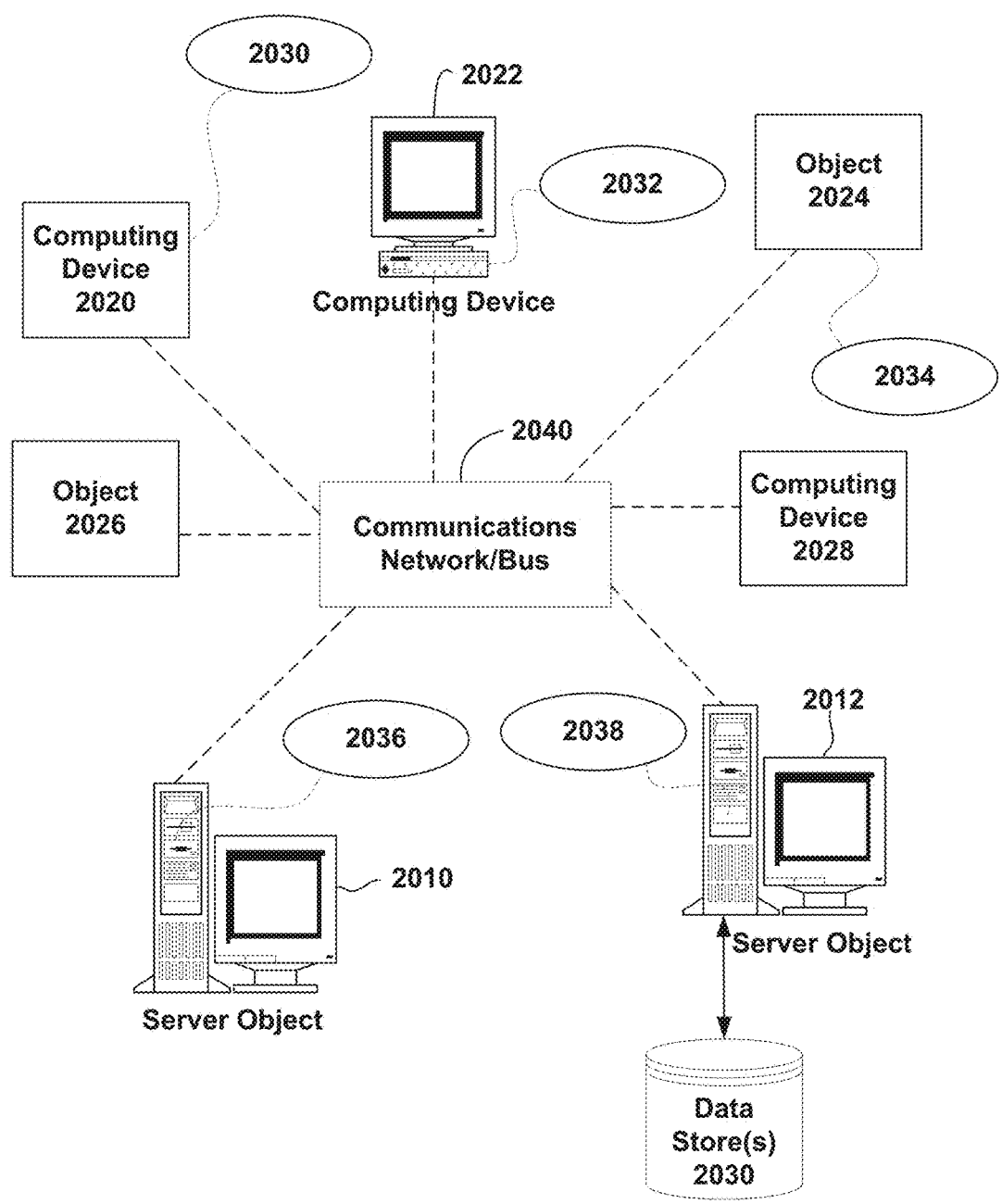
FIG. 20 is a block diagram representing exemplary non-limiting networked environments in which various embodiments described herein can be implemented.

FIG. 20 provides a non-limiting schematic diagram of an exemplary networked or distributed computing environment. The distributed computing environment comprises computing objects or devices 2010, 2012, etc. and computing objects or devices 2020, 2022, 2024, 2026, 2028, etc., which may include programs, methods, data stores, programmable logic, etc., as represented by applications 2030, 2032, 2034, 2036, 2038. It can be appreciated that computing objects or devices 2010, 2012, etc. and computing objects or devices 2020, 2022, 2024, 2026, 2028, etc. may comprise different devices, such as PDAs (personal digital assistants), audio/video devices, mobile phones, MP3 players, laptops, etc.

Each computing object or device 2010, 2012, etc. and computing objects or devices 2020, 2022, 2024, 2026, 2028, etc. can communicate with one or more other computing objects or devices 2010, 2012, etc. and computing objects or devices 2020, 2022, 2024, 2026, 2028, etc. by way of the communications network 2040, either directly or indirectly.

Even though illustrated as a single element in FIG. 20, network 2040 may comprise other computing objects and computing devices that provide services to the system of FIG. 20, and/or may represent multiple interconnected networks, which are not shown. Each computing object or device 2010, 2012, etc. or 2020, 2022, 2024, 2026, 2028, etc. can also contain an application, such as applications 2030, 2032, 2034, 2036, 2038, that might make use of an API (application programming interface), or other object, software, firmware and/or hardware, suitable for communication with or implementation of the disclosed aspects in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 20, as a non-limiting example, computing objects or devices 2020, 2022, 2024, 2026, 2028, etc. can be thought of as clients and computing objects or devices 2010, 2012, etc. can be thought of as servers where computing objects or devices 2010, 2012, etc. provide data services, such as receiving data from computing objects or devices 2020, 2022, 2024, 2026, 2028, etc., storing of data, processing of data, transmitting data to computing objects or devices 2020, 2022, 2024, 2026, 2028, etc., although any computer can be considered a client, a server, or both, depending on the circumstances. Any of these computing devices may be processing data, or requesting services or tasks that may implicate aspects and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 2040 is the Internet, for example, the computing objects or devices 2010, 2012, etc. can be Web servers with which the computing objects or devices 2020, 2022, 2024, 2026, 2028, etc. communicate via any of a number of known protocols, such as HTTP. As mentioned, computing objects or devices 2010, 2012, etc. may also serve as computing objects or devices 2020, 2022, 2024, 2026, 2028, etc., or vice versa, as may be characteristic of a distributed computing environment.

Exemplary Computing Device

As mentioned, several of the aforementioned embodiments apply to any device wherein it may be desirable to include a computing device to facilitate implementing the aspects disclosed herein. It is understood, therefore, that handheld, portable and other computing devices and computing objects of all kinds are contemplated for use in connection with the various embodiments described herein. Accordingly, the below general purpose remote computer described below in FIG. 21 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 21:
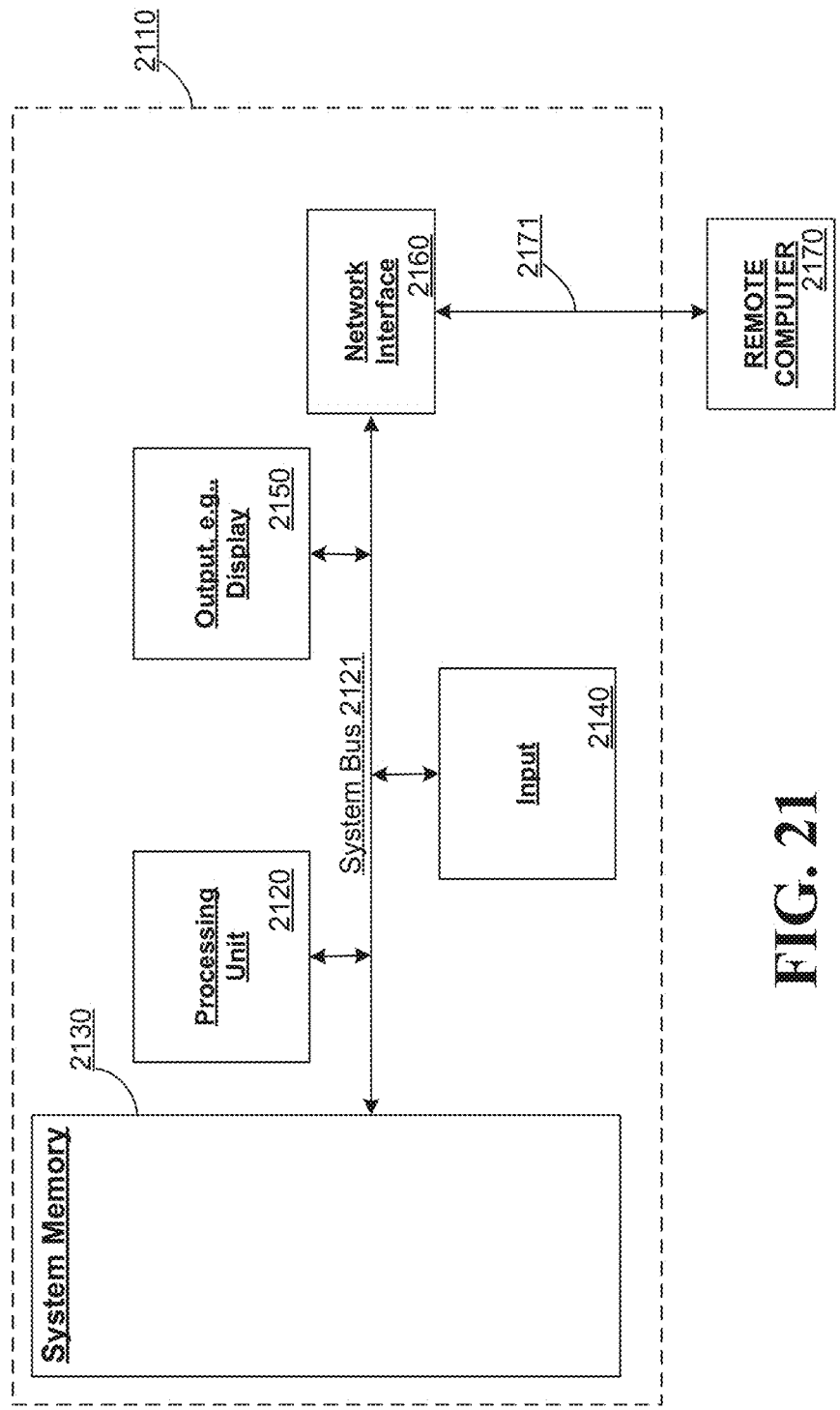
FIG. 21 is a block diagram representing an exemplary non-limiting computing system or operating environment in which one or more aspects of various embodiments described herein can be implemented.

FIG. 21 thus illustrates an example of a suitable computing system environment 2100 in which one or more of the embodiments may be implemented, although as made clear above, the computing system environment 2100 is only one example of a suitable computing environment and is not intended to suggest any limitation as to the scope of use or functionality of any of the embodiments. The computing environment 2100 is not to be interpreted as having any dependency or requirement relating to any one or combination of components illustrated in the exemplary operating environment 2100.

With reference to FIG. 21, an exemplary remote device for implementing one or more embodiments herein can include a general purpose computing device in the form of a handheld computer 2110. Components of handheld computer 2110 may include, but are not limited to, a processing unit 2120, a system memory 2130, and a system bus 2121 that couples various system components including the system memory to the processing unit 2120.

Computer 2110 typically includes a variety of computer readable media and can be any available media that can be accessed by computer 2110. The system memory 2130 may include computer storage media in the form of volatile and/or nonvolatile memory such as read only memory (ROM) and/or random access memory (RAM). By way of example, and not limitation, memory 2130 may also include an operating system, application programs, other program modules, and program data.

A user may enter commands and information into the computer 2110 through input devices 2140 A monitor or other type of display device is also connected to the system bus 2121 via an interface, such as output interface 2150. In addition to a monitor, computers may also include other peripheral output devices such as speakers and a printer, which may be connected through output interface 2150.

The computer 2110 may operate in a networked or distributed environment using logical connections to one or more other remote computers, such as remote computer 2170. The remote computer 2170 may be a personal computer, a server, a router, a network PC, a peer device or other common network node, or any other remote media consumption or transmission device, and may include any or all of the elements described above relative to the computer 2110. The logical connections depicted in FIG. 21 include a network 2171, such local area network (LAN) or a wide area network (WAN), but may also include other networks/buses.

Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to implement the aspects disclosed herein.

There are multiple ways of implementing one or more of the embodiments described herein, e.g., an appropriate API, tool kit, driver code, operating system, control, standalone or downloadable software object, etc. which enables applications to implement the aspects disclosed herein. Embodiments may be contemplated from the standpoint of an API (or other software object), as well as from a software or hardware object that facilitates implementing the aspects disclosed herein in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment.

What is claimed is:

1. A method comprising:
   authenticating a user based on user information included in a request to enter a property secured by a locking mechanism;
   providing the user with physical access to the property in response to an authentication of the user, wherein the physical access is remotely provided; and
   providing the user with a virtual tour of the property via an array of hologram devices respectively placed in a plurality of locations associated with the property, wherein the virtual tour comprises a remote real time interaction with the user during the physical access of the property, wherein the remote real time interaction includes at least a first interaction at a first of the plurality of locations and a second interaction at a second of the plurality of locations different from the first of the plurality of locations, and wherein the first interaction occurs via a first hologram device of the array of hologram devices, and the second interaction occurs via a second hologram device of the array of hologram devices.

2. The method of claim 1, further comprising remotely monitoring the property during the virtual tour.

3. The method of claim 1, further comprising remotely locking the property upon a conclusion of the virtual tour.

4. The method of claim 1, wherein the user information includes biometric data associated with the user, and wherein the authenticating comprises analyzing the biometric data.

5. The method of claim 1, wherein providing the user with physical access to the property comprises remotely unlocking the locking mechanism.

6. The method of claim 1, wherein providing the user with physical access to the property comprises remotely unlocking a lock box.

7. A system, comprising:
- an authentication component configured to authenticate a user based on user information included in a request to enter a property secured by a locking mechanism;
- an access component configured to provide the user with physical access to the property in response to an authentication of the user, wherein the access component is further configured to provide the physical access via remote control; and
- an interaction component comprising an array of hologram devices respectively placed in a plurality of locations associated with the property, the array of hologram devices configured to provide the user with a virtual tour of the property, wherein the virtual tour comprises a remote real time interaction with the user during the physical access of the property, wherein the remote real time interaction includes at least a first interaction at a first of the plurality of locations and a second interaction at a second of the plurality of locations different from the first of the plurality of locations, and wherein the first interaction occurs via a first hologram device of the array of hologram devices, and the second interaction occurs via a second hologram device of the array of hologram devices.

8. The system according to claim 7, further comprising a monitoring component configured to monitor the property during the virtual tour.

9. The system according to claim 8, wherein the monitoring component comprises at least one of a camera or a sensor.

10. A computer-readable storage medium, comprising:
- a memory component configured to store computer-readable instructions, the computer-readable instructions configured to cause performance of the following acts:
- authenticating a user based on user information included in a request to enter a property secured by a locking mechanism;
- providing the user with physical access to the property in response to an authentication of the user, wherein the physical access is remotely provided; and
- providing the user with a virtual tour of the property via an array of hologram devices respectively placed in a plurality of locations associated with the property, wherein the virtual tour comprises a remote real time interaction with the user during the physical access of the property, wherein the remote real time interaction includes at least a first interaction at a first of the plurality of locations and a second interaction at a second of the plurality of locations different from the first of the plurality of locations, and wherein the first interaction occurs via a first hologram device of the array of hologram devices, and the second interaction occurs via a second hologram device of the array of hologram devices.

11. The computer-readable storage medium of claim 10, wherein the authenticating comprises analyzing biometric data associated with the user.

12. The computer-readable storage medium of claim 10, wherein the acts further comprise prioritizing data associated with the property based on the user information.

\* \* \* \* \*